United States Patent [19]

Kao et al.

[11] 4,013,842

[45] Mar. 22, 1977

[54] METHOD AND APPARATUS FOR INTERFACING DIGITAL AND ANALOG CARRIER SYSTEMS

[75] Inventors: Chih-Yu Kao, Lawrence; Carl Ferdinand Kurth, Andover, both of Mass.

[73] Assignee: Bell Telephone Laboratories, Incorporated, Murray Hill, N.J.

[22] Filed: Apr. 15, 1976

[21] Appl. No.: 677,400

[52] U.S. Cl. .................... 179/15 FD; 179/15 A; 179/15 BM
[51] Int. Cl.² ........................................ H04J 1/00
[58] Field of Search ...... 179/15 FD, 15 FS, 15 BY, 179/15 BM, 15 R, 15 A

[56] References Cited
UNITED STATES PATENTS 3,328,528   6/1967   Darlington .................. 179/15 BM

OTHER PUBLICATIONS

IEEE Transactions on Circuit Theory, vol. CT-17, No. 3, Aug. 1970, "On Digital Single-Sideband Modulators", by S. Darlington, pp. 409-414.
IEEE Transactions on Communication Technology, vol. COM-19, No. 1, Feb. 1971, "SSB/FDM Utilizing TDM Digital Filters", by C. F. Kurth, pp. 63-71.

Primary Examiner—William C. Cooper
Assistant Examiner—Joseph A. Popek
Attorney, Agent, or Firm—Bryan W. Sheffield

[57] ABSTRACT

Apparatus for interconnecting a time-division multiplex carrier system, such as T1, with a frequency-division multiplex carrier system, such as LMX-3. The interconnexion is effected in an all digital manner by the use of digital filters, thus avoiding the necessity of down-converting either system to voiceband.

12 Claims, 26 Drawing Figures

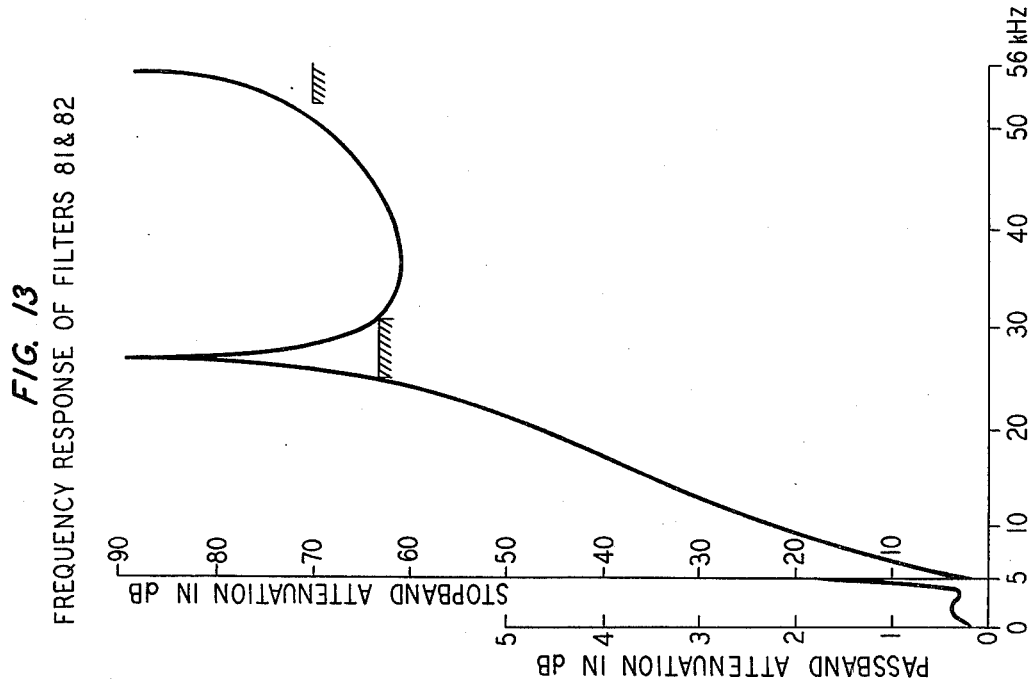
FIG. 13 FREQUENCY RESPONSE OF FILTERS 81 & 82
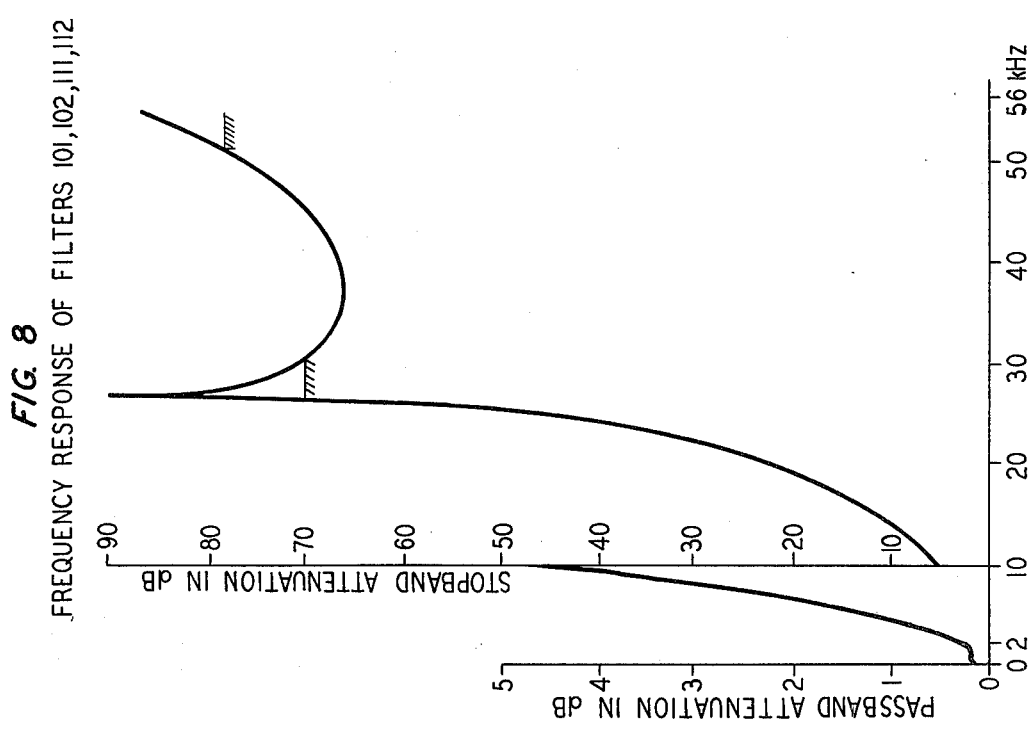
FIG. 8 FREQUENCY RESPONSE OF FILTERS 101, 102, 111, 112

SEMI-SYMMETRICAL BANDPASS FILTER 89

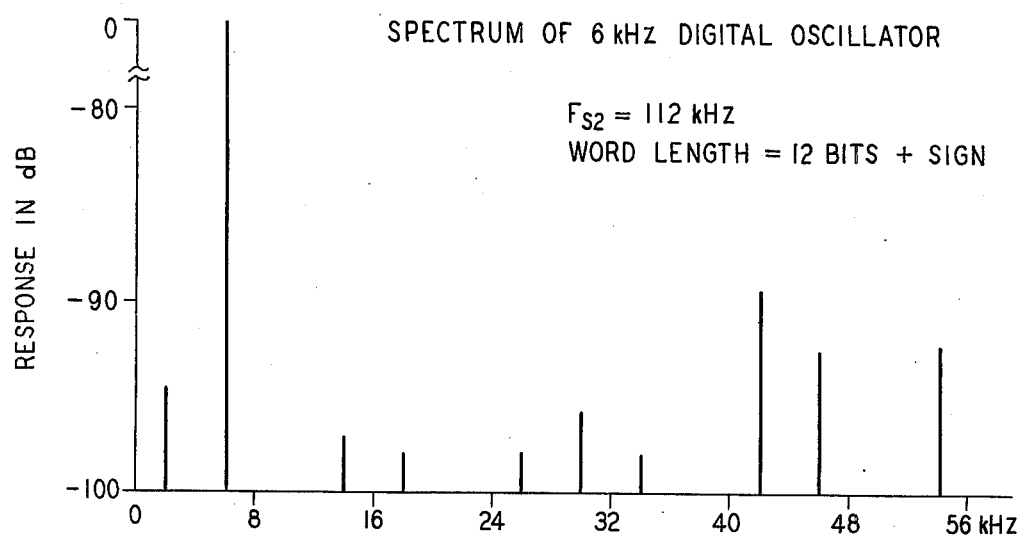
FIG. 17A — SPECTRUM OF 6 kHz DIGITAL OSCILLATOR
$F_{S2} = 112$ kHz
WORD LENGTH = 12 BITS + SIGN
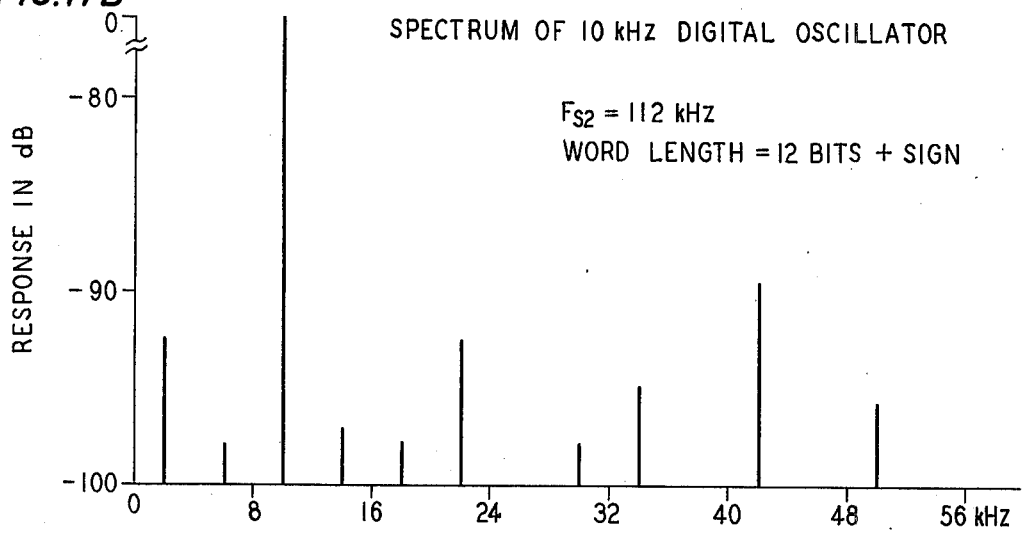
FIG. 17B — SPECTRUM OF 10 kHz DIGITAL OSCILLATOR
$F_{S2} = 112$ kHz
WORD LENGTH = 12 BITS + SIGN
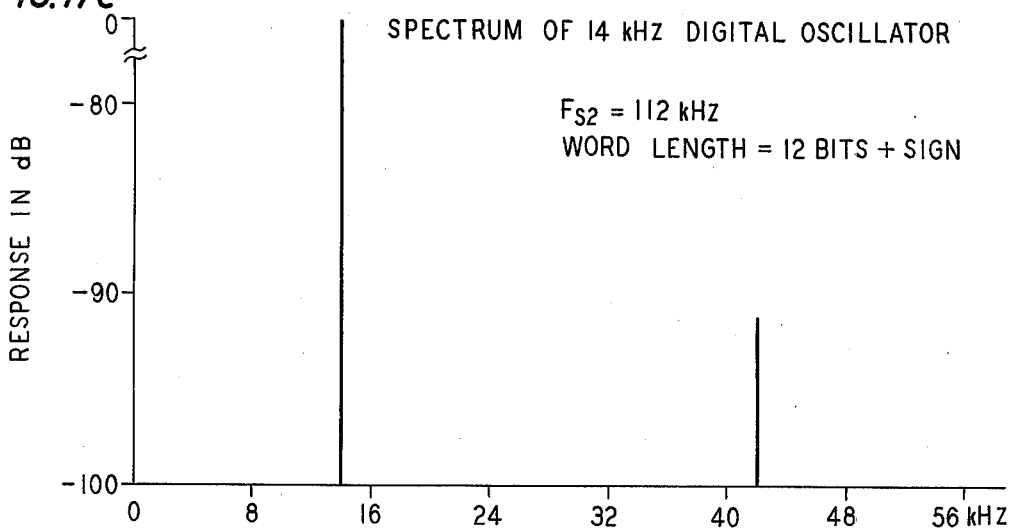
FIG. 17C — SPECTRUM OF 14 kHz DIGITAL OSCILLATOR
$F_{S2} = 112$ kHz
WORD LENGTH = 12 BITS + SIGN

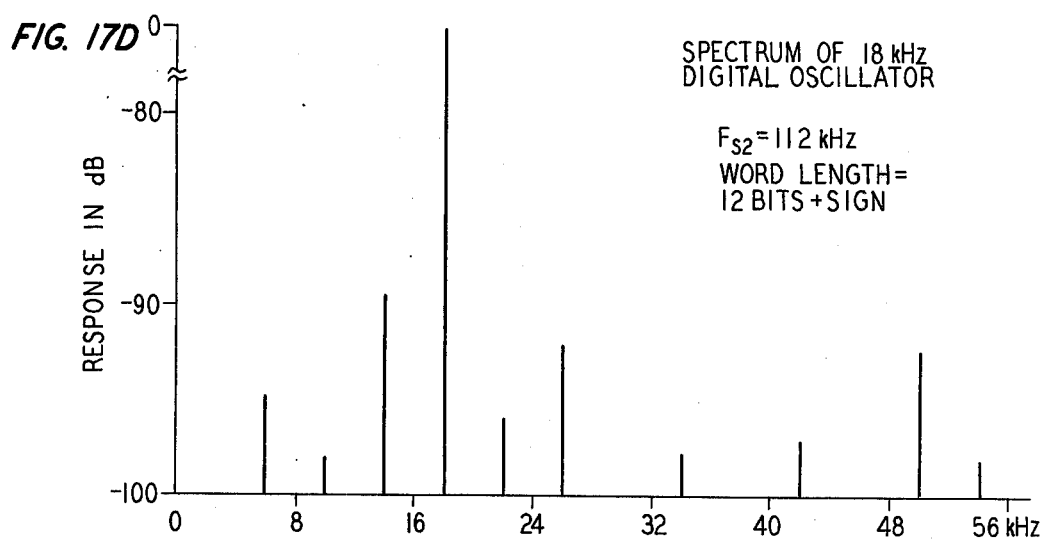
FIG. 17D — SPECTRUM OF 18 kHz DIGITAL OSCILLATOR
$F_{S2} = 112$ kHz
WORD LENGTH = 12 BITS + SIGN
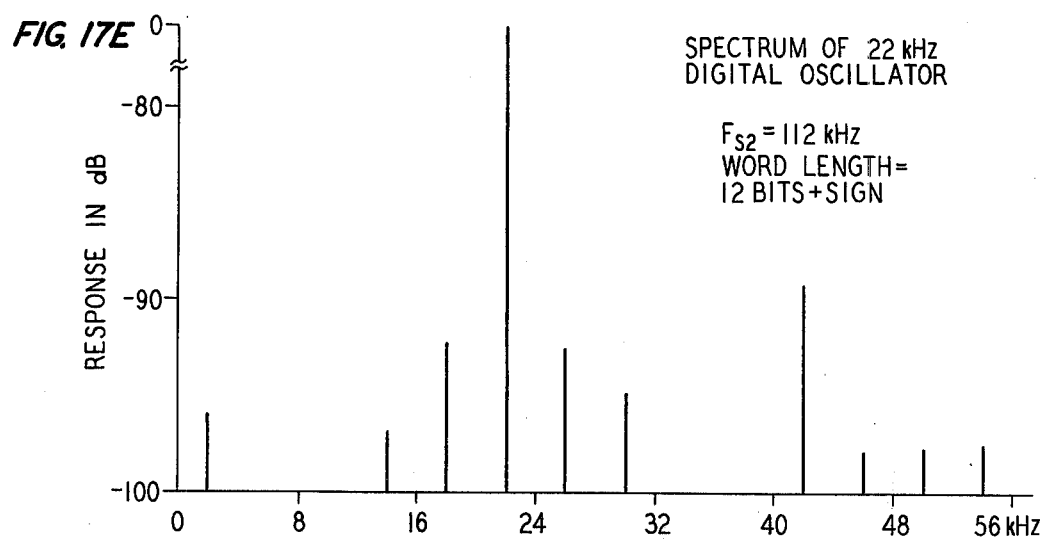
FIG. 17E — SPECTRUM OF 22 kHz DIGITAL OSCILLATOR
$F_{S2} = 112$ kHz
WORD LENGTH = 12 BITS + SIGN
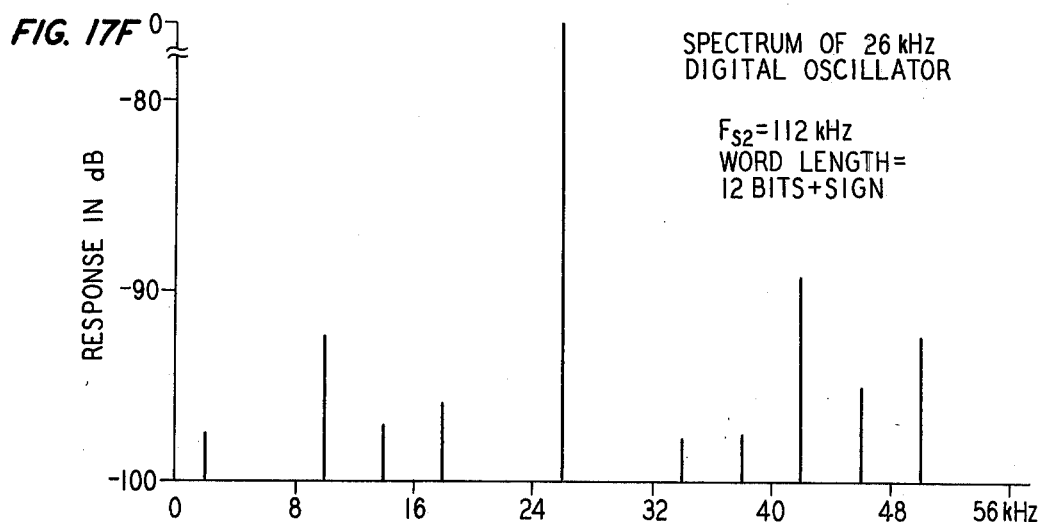
FIG. 17F — SPECTRUM OF 26 kHz DIGITAL OSCILLATOR
$F_{S2} = 112$ kHz
WORD LENGTH = 12 BITS + SIGN

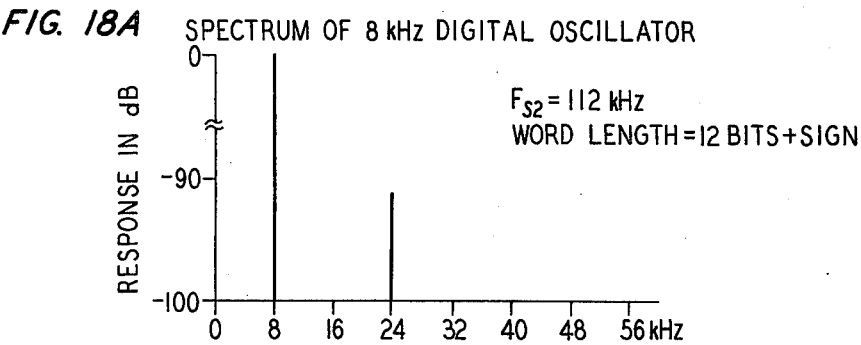
FIG. 18A  SPECTRUM OF 8 kHz DIGITAL OSCILLATOR
$F_{S2}$ = 112 kHz
WORD LENGTH = 12 BITS + SIGN
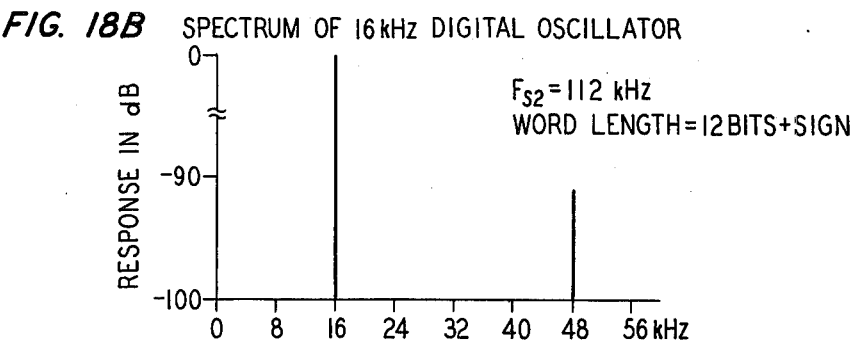
FIG. 18B  SPECTRUM OF 16 kHz DIGITAL OSCILLATOR
$F_{S2}$ = 112 kHz
WORD LENGTH = 12 BITS + SIGN
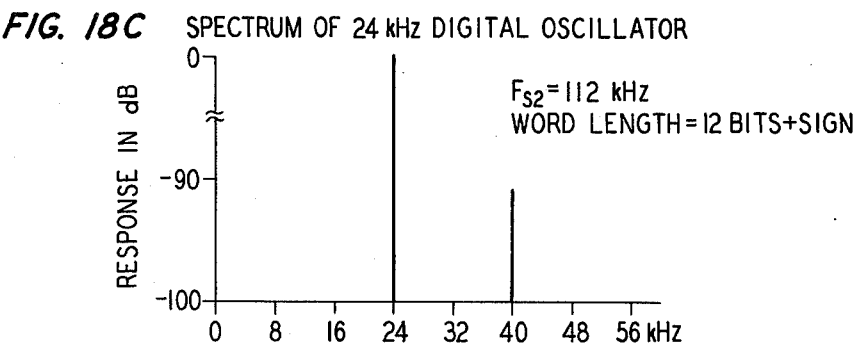
FIG. 18C  SPECTRUM OF 24 kHz DIGITAL OSCILLATOR
$F_{S2}$ = 112 kHz
WORD LENGTH = 12 BITS + SIGN
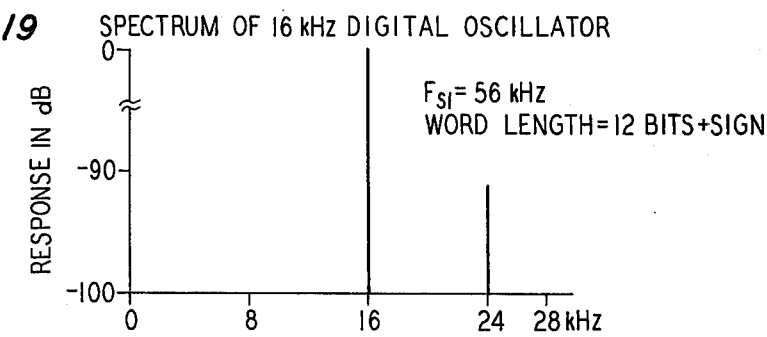
FIG. 19  SPECTRUM OF 16 kHz DIGITAL OSCILLATOR
$F_{S1}$ = 56 kHz
WORD LENGTH = 12 BITS + SIGN

METHOD AND APPARATUS FOR INTERFACING DIGITAL AND ANALOG CARRIER SYSTEMS

BACKGROUND OF THE INVENTION a. Field of the Invention

Broadly speaking, this invention relates to telecommunications. More particularly, in a preferred embodiment, this invention relates to methods and apparatus for interconnecting time and frequency-division multiplex carrier systems.

b. Discussion of the Prior Art

As is well known, the communications industry makes extensive use of frequency-division multiplex carrier systems. However, recent advances in silicon technology have made the use of time-division multiplex systems increasingly attractive, especially for short-haul use.

Because of the large investment in existing plant, both FDM and TDM carrier systems will co-exist in industry for years to come. It thus becomes necessary to consider how best to interface these systems, as might be required, for example, at some intermediate central location.

One approach to this problem is simply to convert the signals carried by both systems to voiceband and then make the necessary interconnexion on a channel-by-channel, voice-frequency basis. This requires a back-to-back connexion of existing analog equipment which, so far, has been avoided for economic reasons.

A paper by Freeny, Kieburtz, Mina and Tewksbury entitled "Design of Digital Filters for an All Digital Frequency Division Multiplex-Time Division Multiplex Translator" which appeared in the *IEEE Transactions on Circuit Theory*, Vol. CT-18, No. 6, Nov., 1971, pp. 702–711, and a paper by C. F. Kurth entitled "SSB/FDM Utilizing TDM Digital Filters" which appeared in *IEEE Transactions on Communication Technology*, Vol. COM-19, No. 1, Feb., 1971, pp. 63–71, both suggest that the interface between an analogue multiplex system and a digital multiplex system may be effectuated in an alldigital manner by the use of digital filtering.

The above-referenced papers propose several possible approaches to this problem and demonstrates that the all-digital approach is economically viable. However, no practical solution is given in these papers.

SUMMARY OF THE INVENTION

The problem, then, is to provide an all-digital technique for interconnecting an analogue, frequency-division, multiplex system with a digital, time-division, multiplex system. The technique must be economical to implement and must add no more noise and distortion to the connexion than would result from converting both systems to voiceband.

This problem has been solved by the instant invention which, in a preferred embodiment, comprises apparatus for interconnecting at least one channel in an $n$-channel, time-division multiplex carrier system with a corresponding channel in a $p$-channel, frequency-division multiplex, carrier system, $p \geq n$. The channel to be interconnected carries a first information signal of nominal bandwidth $b$ and the time-division multiplex carrier system has a sampling frequency $k$. The apparatus comprises means for increasing the sampling frequency of the at least one time-division multiplex channel from $k$ to $mk$, where $m$ is an integer selected such that the frequency band occupied by the frequency-division multiplex carrier system, when loaded with $p$-channels, lies between the frequencies $mk$ and $2\ mk$, that is to say, $m$ is selected such that $mk > pb$. The apparatus also includes means, connected to the sampling frequency increasing means, for filtering from the channel a plurality of second information signals each having a nominal bandwidth $b$ and each having the same information content at the first information signal, the second information signals being centered about the frequency $mk/4$ and odd harmonics thereof, the filtered second information signals comprising upper and lower, suppressed-carrier, single-sideband signals in the frequency spectrum of the frequency division multiplex carrier system but being displaced from the desired frequency slots therein. The apparatus also includes means for modulating the second information signals with the frequency $mk/4$ while simultaneously increasing the sampling frequency thereof from $mk$ to $2\ mk$ thereby to generate an overlapped upper and lower single-sideband signal of bandwidth $b$ centered about zero frequency and replicas thereof centered about multiples of $mk/2$, means for filtering from the output of the modulating means all signals other than the overlapped sideband signals centered about zero frequency and the image thereof centered about the frequency $mk$, and means for modulating the output of the modulating output filtering means by the sinusoidal and cosinusoidal functions of the frequency $r$. Lastly, the apparatus includes means for summing the results of the sinusoidal and cosinusoidal modulation thereby to generate an upper sideband signal of bandwidth $b$ displaced upwardly from zero frequency by the frequency $r$ and a lower sideband signal displaced downwardly from the frequency $2\ mk$ by the frequency $r$, a digital-to-analogue converter for converting the upper and lower sideband signals into their analogue equivalents, the conversion being effectuated at the sampling frequency $2\ mk$ and an analogue bandpass filter, having a passband centered about the frequency $3\ mk/2$, connected to the output of the digital-to-analogue converter for rejecting all but the lower sideband signals, the frequency $r$ being selected such that the lower sideband signal occupies the desired frequency slot in the spectrum of the $p$-channel frequency division multiplex carrier system.

The invention and its mode of operation will be more fully understood from the following detailed description, when taken with the appended drawings in which:

DETAILED DESCRIPTION OF THE DRAWINGS

FIG. 8 is a graph showing the response of the third order low-pass filter employed in the circuitry of FIG. 3;

FIG. 13 is a graph showing the response of the filter shown in FIG. 12;

FIGS. 17A through 17F are graphs showing the spectrum of various digital oscillators employed in the circuitry shown in FIG. 3;

FIGS. 18A through 18C are graphs depicting the spectrum of oscillators employed in the circuit shown in FIG. 5; and FIG. 19 is a graph showing the spectrum of another oscillator employed in the circuitry shown in FIG. 5.

DETAILED DESCRIPTION OF THE INVENTION

The invention will now be described with reference to the interconnexion of a specific digital carrier, i.e., the 24-channel PCM system known in the industry as T1, and any of several, 12-channel, analogue carriers which employ the A6 channel bank, for example, the system known in the industry as LMX-3. A person skilled in the art will appreciate, however, that the invention is not so limited and, with appropriate modifications, may be used to interconnect any digital time-division system with any analogue frequency-division system, provided, of course, that the systems are otherwise compatible.

Figure 1:
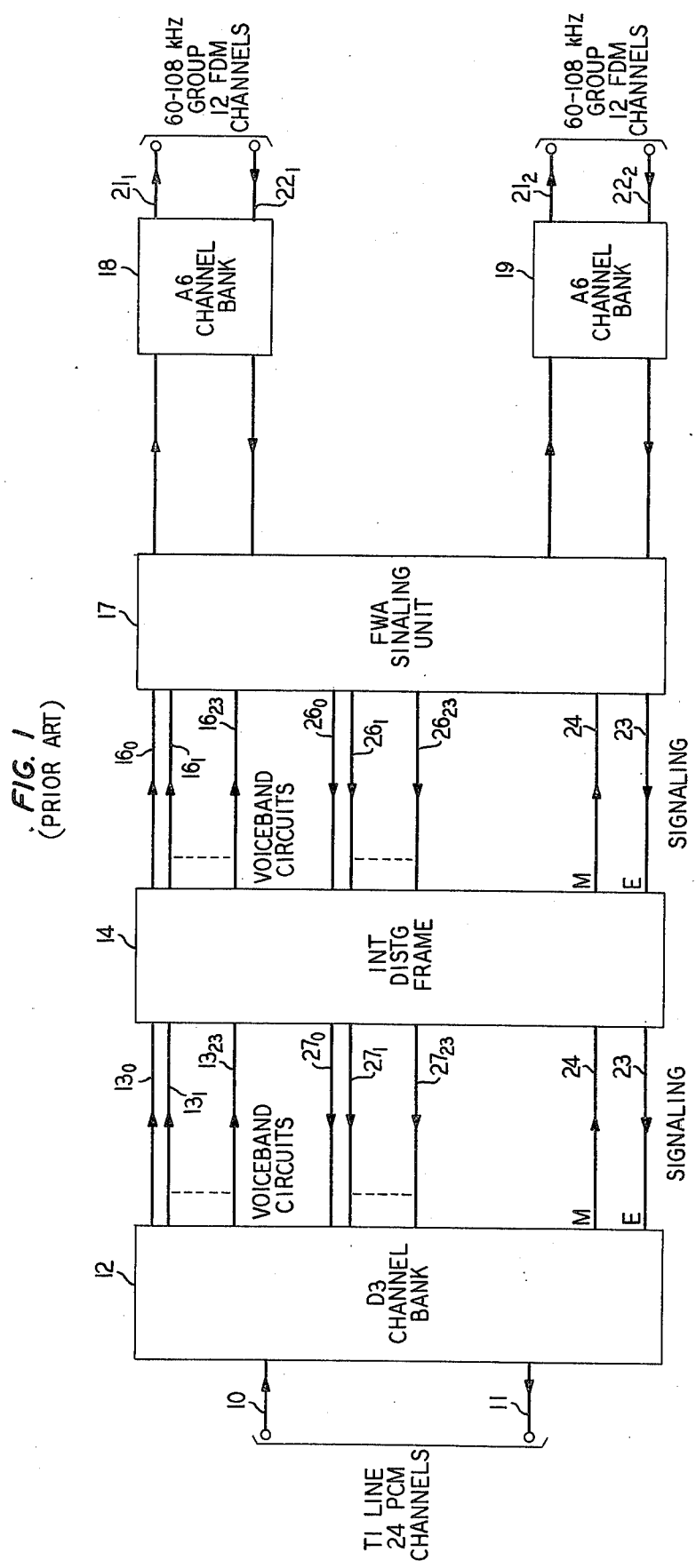
FIG. 1 is a block schematic drawing depicting the prior art approach for interconnecting digital and analogue carrier systems.

FIG. 1 depicts the prior art approach used to achieve this interconnexion. As shown, the 24 PCM channels comprising a T1 digroup are connected, via leads 10 and 11, to some suitable channel bank 12, for example, a D3 channel bank. Considering for the moment only eastbound transmission, the PCM signal on lead 10 is converted by the D3 channel bank into 24 analogue voiceband signals, each of which has a bandwidth of approximately 300–3,400 Hz. These voiceband signals are then applied, via leads $13_0$–$13_{23}$, to an intermediate distributing frame 14, thence, via leads $16_0$–$16_{23}$, to an FWA signaling unit 17 and the inputs of a pair of 12-channel, A6 channel banks 18 and 19.

The output signal from each A6 channel bank, on leads $21_1$ and $21_2$, respectively comprises a frequency-division multiplexed signal occupying the 60–108 kHz portion of the frequency spectrum. These multiplexed signals are then transmitted, via some suitable transims- sion medium, to a corresponding D3 channel bank at the distant location (not shown).

For each of the channels in the T1 digroup, the switchhook supervision contained in the T1 frame is converted by the D3 channel bank into conventional d.c. signaling on E & M signaling leads 23 and 24, only one pair of which is shown to avoid cluttering the drawing. The signals on the E & M leads are converted by FWA signaling unit 17 into 2600 cycle, single-frequency signaling tones which are added to the corresponding voiceband signal for each channel for transmission over the transmission medium.

Transmission in the reverse direction is entirely analogous. The 24 incoming FDM channels are converted to voiceband in A6 channel banks 18 and 19 and connected, via the FWA signaling unit 17 and leads $26_0$–$26_{23}$, to the intermediate distributing frame 14, thence via leads $27_0$–$27_{23}$, to the inputs of the D3 channel bank 12. D3 channel bank 12 converts the 24 voiceband signals into a PCM, time-division multiplexed signal which is then transmitted, via line 11, to a corresponding digital channel bank at the distant location. The 2600 cycle SF signaling tone in each voiceband channel is converted by FWA signaling unit 17 into E & M lead d.c. signaling which the D3 channel bank digitalizes and adds to the PCM signal for that channel.

It will be obvious from the above description that the conversion of the PCM signals to voiceband and the subsequent translation to an FDM signal at a higher frequency, and vice versa, requires a considerable amount of equipment. If the incoming multiplexed PCM signal could be directly converted to the desired single-sideband signal in the appropriate frequency slot for the particular FDM carrier system employed, here one of 12 channels in a 60–108 kHz spectrum, a considerable economic savings would result, and greater efficiency achieved.

Figure 2:
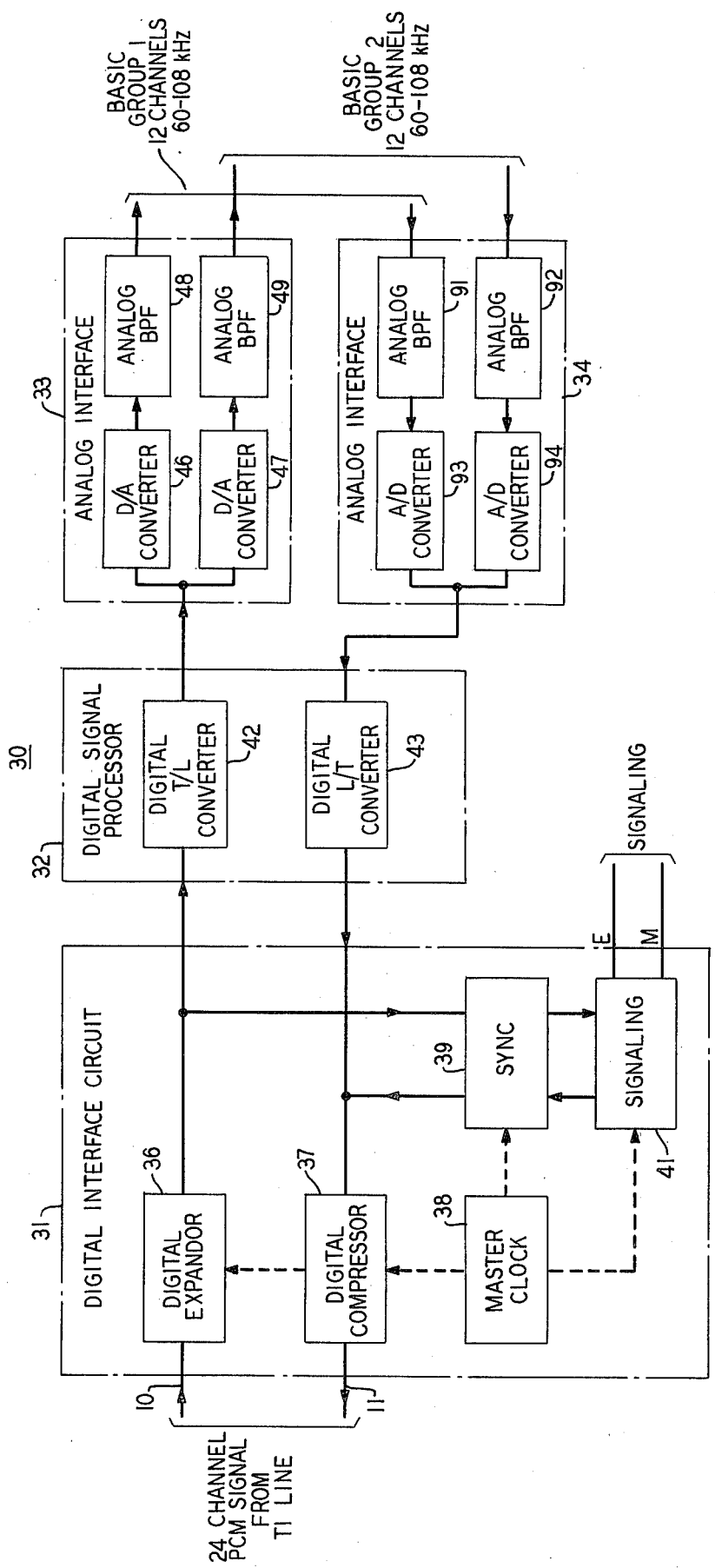
FIG. 2 is a block schematic diagram of an illustrative circuit arrangement for interconnecting digital and analogue carrier systems according to the invention.

FIG. 2 depicts an illustrative converter 30 according to the invention which may be used to achieve this direct digital-to-analogue and analogue-to-digital connexion. As shown, converter 30 comprises a digital interface circuit 31, a digital signal processor 32, and a pair of analogue interface circuits 33 and 34, one for each of the two, 12-channel carrier systems which are to be interfaced with the digital T1 system.

As will be explained, digital signal processor 32 both generates and requires linearized PCM signals. However, most digital carrier systems, and the T1 system in particular, utilize a compressed PCM signal and for that reason digital interface circuit 31 includes a digital expandor 36 which linearizes the digitally encoded PCM signal on line 10, prior to its application to processor 32, as well as a digital compressor 37 which compresses the digitally encoded PCM output from processor 32, prior to its application to the T1 line 11. Interface circuit 31 also includes a master clock circuit 38, a synchronizing circuit 39 driven by the master clock, and a signaling unit 41 which, as previously discussed, derives for each channel the d.c. signaling information corresponding to the signaling bits in each T1 frame.

Digital interface circuit 31, per se, forms no part of the invention and performs essentially the same function that comparable elements perform within the D3 channel bank. See, for example, the article entitled "The D3 Channel Bank" by W. B. Gaunt and J. B. Evans, Jr., *Bell Laboratories Record*, Aug., 1972, pp.

229–233, and the article entitled "The T1 Carrier System" by K. E. Fultz and D. B. Penick, *Bell System Technical Journal*, Vol. 44, No. 7, Sept., 1965, pp. 1405–1451, both of which articles are hereby incorporated by reference.

Processor 32 includes a digital T/L converter 42 and a digital L/T converter 43, the operation of which will be discussed in detail below. Suffice it to say for the moment, that converter 42 takes 24 multiplexed PCM signals, each representative of a 300–3,400 Hz voiceband signal, and converts them to PCM signals representative of single-sideband signals which are located in appropriate frequency slots for the analogue carrier system employed, LMX-3 in the illustrative example.

Analogue interface circuit 33 includes a pair of D/A converters 46 and 47 and a pair of analogue bandpass filters 48 and 49 which convert the digitally encoded PCM signals from T/L converter 42 into the desired single-sideband signals in the frequency slots of interest. In like manner, analogue interface circuit 34 includes a pair of analogue bandpass filters 91 and 92 and a pair of A/D converters 93 and 94 which digitalize each of the incoming single-sideband signals present in differing frequency slots in the two LMX-3 carriers connected thereto.

As will be explained below, digital L/T converter 43 takes the encoded PCM outputs from A/D converters 93 and 94 and translates them into PCM signals which are representative of a voiceband signal while simultaneously multiplexing them into the T1 format for transmission over T1 line 11 after the signals have been compressed in digital compressor 37. At the same time, signaling circuit 41 converts the single-frequency signaling tones associated with each of the 24 incoming FDM channels into appropriate digital signaling information in each T1 frame.

Figure 3:
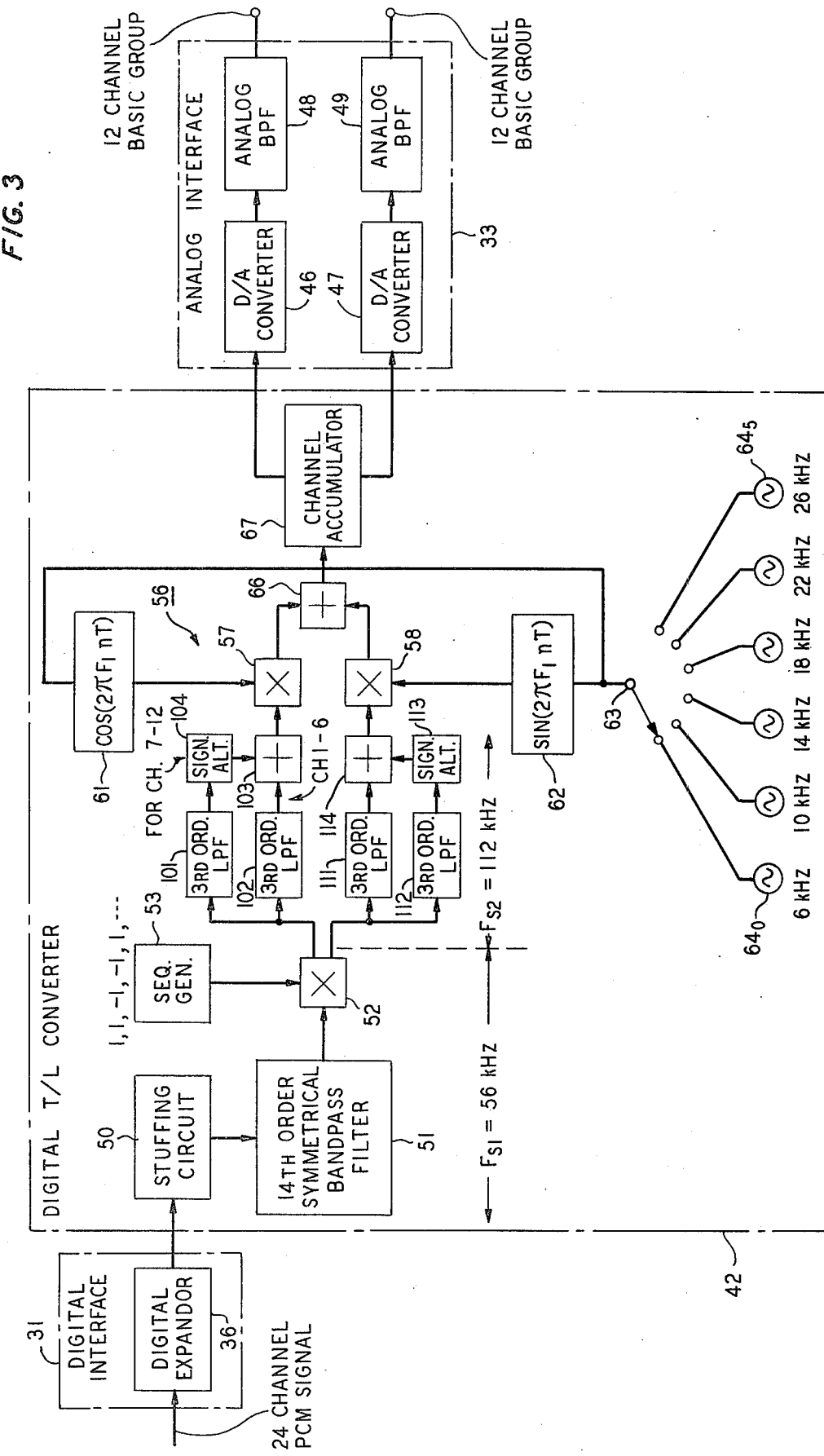
FIG. 3 is a block schematic diagram depicting the digital-to-analogue portion of the circuitry shown in FIG. 2 in greater detail.

FIG. 3 depicts the circuitry of T/L converter 42 in greater detail. As shown, the output of digital expandor 36 is connected to the input of a stuffing circuit 50, thence to a symmetrical, fourteenth order, digital bandpass filter 51.

The output of filter 51 is connected to a Weaver modulator which comprises first and second quadrature modulators 52, 56, and a plurality of third-order, digital, low-pass filters connected therebetween. Modulator 52 is also connected to a sequence generator 53 which generates the binary sequence 1, 1, −1, −1, 1, 1 ... which is a composite of the samples of a 14 kHz cosine and sine function. Modulator 56 comprises a pair of modulator stages 57, 58 respectively driven by cosinusoidal and sinusoidal oscillators 61 and 62. The Weaver modulator includes in its upper branch a pair of third-order, digital, low-pass filters 101 and 102, the outputs of which are connected to an adder 103, thence to modulator stage 57. A sign alternator 104 is connected between filter 101 and adder 103 to invert every other sample for channels 7–12. The lower branch of modulator 56 similarly comprises a pair of filters 111 and 112, a sign alternator 113 and an adder 114 and functions in an analogous manner.

The Weaver modulator and its principle of operation is discussed in the book *Signal Theory* by L. E. Franks, Prentice-Hall, Inc., Englewood Cliffs, New Jersey, 1969. See also the articles "An Introduction to Single-Sideband Communications" by J. F. Honey and D. K. Weaver, Jr., *Proceedings of the IRE*, Vol. 44, No. 12, Dec., 1956, pp. 1667–1675 and "Polyphase Modulation As a Solution of Certain Filtration Problems in Telecommunication" by I. F. MacDiarmid and D. G. Tucker, *Proceedings of the I.E.E.*, Vol. 97, Part III, 1950, pp. 349–358, all of which are hereby incorporated by reference.

Returning to FIG. 3, oscillators 61 and 62 are selectively driven, via an electronic switch 63, by a plurality of oscillators $64_0$–$64_5$. The output of modulator stages 57 and 58 are then summed in an adder circuit 66 which is connected, via a channel accumulator 67, to the inputs of both D/A converters 46 and 47 within the analogue interface circuit 33.

The operation of the circuit shown in FIG. 3 is best described with reference to FIG. 4. As shown, graph (*a*) represents the spectrum of any one of the 24 PCM channels in the T1 digroup which are to be converted, after the digroup has been linearized in expandor 36. The slope of the spectrum for each channel indicates the sideband orientation with respect to audio frequency; that is, the highest sideband amplitude represents the highest frequency. Since in a typical voiceband signal the highest frequencies do *not* have the highest amplitude, the frequency spectra depicted in FIG. 4 do not actually represent the spectra that would be observed by the use of a spectrum analyzer; nevertheless, because they depict the frequency relationships among the various signals they are most useful in explaining the operation of the circuit shown in FIG. 3. Also, although the actual bandwidth of a voice-frequency circuit extends from about 300–3,400 kHz we shall assume an idealized 4 kHz bandwidth, which simplifies the description considerably.

Turning again to graph (*a*), because the sampling frequency of a T1 carrier system is 8 kHz, that is, approximately twice the highest frequency in the voiceband channel, the energy in each PCM channel is clustered about harmonics of the sampling frequency, i.e., about 8, 16, 24, 32, . . . kHz. In graph (*a*) the frequency spectrum of the PCM channel is shown as terminating at 112 kHz. In actual practice, these harmonics extend to infinity but for the purposes of the following discussion such higher harmonics may be ignored without introducing significant error.

As is well-known, each one of tbhe energy clusters or sidebands in graph (*a*) contains all the information present in the modulating audio-frequency signals and it is this fact that enables the circuitry shown in FIG. 3 to convert 12 such identical spectra into the spectrum shown in graph (s). Graph (s), of course, represents a typical, 12-channel basic group signal, for example, a basic group signal in the LMX-3 system. As shown, this basic group signal extends from 60 to 108 kHz and each of the 12 analogue voice channels contained therein has a nominal bandwidth of 4 kHz.

In accordance with established custom, the ordering of the channels in the basic group is such that the channel which occupies the highest frequency slot is numbered channel No. 1 while the channel which occupies the lowest frequency slot is numbered channel No. 12. It will also be noted that, in accordance with established custom, the sidebands are all inverter sidebands, that is, they are all the lower sidebands of their respective suppressed carriers.

As previously mentioned, the incoming PCM signal appears on the T1 line at the sampling frequency $F_{ST}$ = 8 kHz and is linearized in expandor 36 from a compressed 8-bit (or 7 5/6 bit) format into a 14-bit linear signal for $\mu$ = 255 in $\mu$-law encoding. The sampling frequency is now increased from $F_{ST}$ = 8 kHz to $F_{SI}$ =

56 kHz by the simple expedient of stuffing 6 zero samples, each more than 14 bits long, after each sample taken at the $F_{ST}$ rate. This stuffing is accomplished in bit-stuffing circuit 50 which is interposed between digital expandor 36 and bandpass filter 51. Alternatively, the bit-stuffing may be accomplished within filter 51 which in the illustrative embodiment is a symmetrical, fourteenth order, digital, bandpass filter. In filter 51, the unwanted portions of the PCM spectrum which fall within the frequency ranges 0–12 kHz and 16–28 kHz are suppressed. Because filter 51 is a digital filter only that portion of the signal spectrum that extends up to 28 kHz need be considered in detail because 28 kHz is one-half of the sampling frequency, $F_{S1} = 56$ kHz, in filter 51. Thus, as shown in graph (b), filter 51 also suppresses unwanted portions of the PCM spectrum which fall in the frequency ranges 28–40 kHz and 44–56 kHz. Of course, the filter characteristic is also folded about the 56 kHz ordinate in FIG. 4, but the signal suppression above 56 kHz need not be considered in detail. The bandpass of interest with respect to filter 51 is from 12–16 kHz which is, of course, a 4 kHz passband centered about 14 kHz. As will be discussed, in the illustrative embodiment, filter 51 comprised a high-pass filter having a sampling rate of 28 kHz and a passband of from 12–14 kHz. The desired symmetrical bandpass was obtained by replacing $Z^{-1}$ by $Z^{-2}$ in the transfer function. It was found that with a hardware speed of 26.88 megabits/second and an internal data word length of 20 bits, only one such filter was required for all 24 channels, when converting from T to L carrier. Graph (c) of FIG. 4 depicts the spectrum that exists after the linearized PCM signal of graph (a) is passed through filter 51. As will be noted, a signal which comprises the lower sideband of a single sideband signal having a suppressed 16 kHz carrier of and the upper sideband of a suppressed 40 kHz carrier are both passed by filter 51.

The next step in the T to L conversion process is to pass the signals shown in graph (c) through the double quadrature modulator 56, illustratively a Weaver modulator, which places the single sideband signal for each channel in an appropriate slot in the 60–108 kHz basic group signal. In modulator 56 the signal is split into the upper and lower paths which are respectively modulated by the cosine and sine of 14 kHz. The midband frequency of the first passband of filter 51, which is also the midband frequency of the lower of the two sideband signals shown in graph (c).

Figure 4:
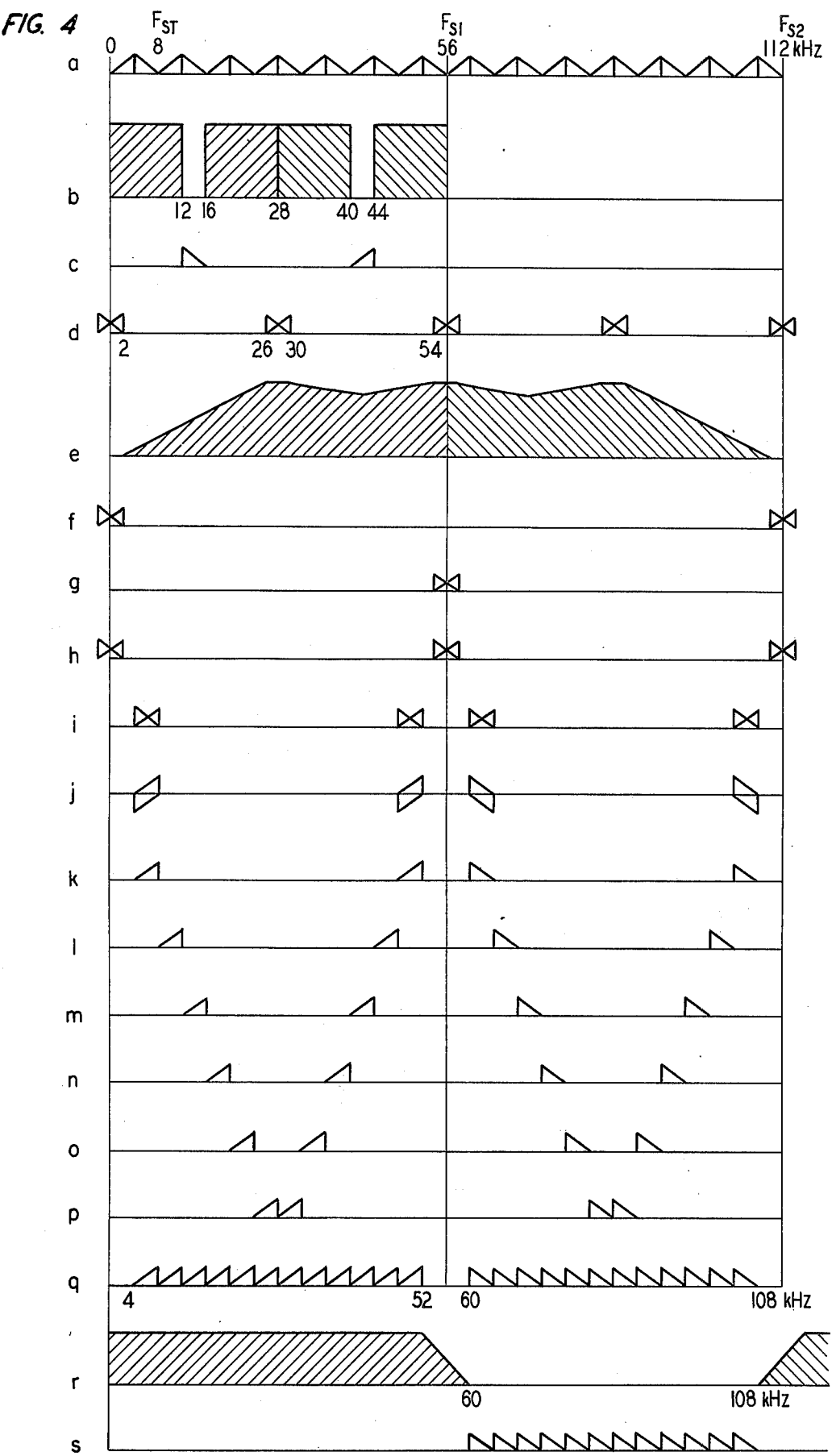
FIG. 4 is a series of graphs depicting the spectra of signals obtained at various locations within the circuitry shown in FIG. 3.

Graph (d) of FIG. 4 shows the spectrum present at the output of the first set of modulators in the Weaver modulator, that is the time-shared, quadrature modulator 52. As the graph shows, the lower sideband signal, formerly extending from 12–16 kHz has been shifted 14 kHz to the left and now occupies that portion of the frequency spectrum which extends from −2 kHz to +2kHz. The lower sideband signal has also been shifted 14 kHz, but this time to the right, so that it now occupies the portion of the frequency spectrum which extends from 26–30 kHz. In like manner, the upper sideband signal formerly extending from 40–44 kHz is shifted to the left by 14 kHz and superimposed on the lower sideband signal already occupying the 26–30 kHz portion of the spectrum. Further, the upper sideband signal is also shifted 14 kHz to the right to occupy the 54–58 kHz portion of the frequency spectrum. Because of symmetry, the single-sideband signals shown in graph (c) also exist in the 56–112 kHz portion of the spectrum but are not shown on the drawing to avoid confusion. All of these signals also exist as negative frequencies extending from 0 to −112 kHz, which accounts for the upper sideband signal extending from −2 kHz to +2 kHz which is superimposed on the lower sideband signal which results when the sideband formerly occupying the 12–16 kHz portion of the spectrum is shifted 14 kHz to the left. In like manner, superimposed upper and lower sideband spectra are produced about the midband frequencies 56, 84 and 112 kHz. Put another way, and as shown in graph (d), overlapped upper and lower sideband signals each representative of the original 0–4 kHz voiceband signal are generated about integer multiples of 28 kHz, or half the sampling frequency of 56 kHz.

At this point, the sampling rate is again increased, from $F_{S1} = 56$ kHz to $F_{S2} = 112$ kHz, by the simple expedient of stuffing a zero sample after each sample taken at the 56 kHz rate. The resultant signal is then processed in modulator 56 to suppress the unwanted, overlapped signals which sideband exist in the 26–30 kHz, 54–58 kHz, and 82–86 kHz portions of the frequency spectrum. Graph (e) in FIG. 4 shows the characteristic of modulator 56, while graph (f) shows the spectrum present at the output of modulator 56. As can be seen from these graphs, the voiceband signal originally present in the PCM signal of graph (a) now exists as overlapped upper and lower sideband signals extending from −2 kHz to +2 kHz and from 110–114 kHz. As will be explained, this is true only for one-half of the channels, channels 1 through 6, channels 7 through 12 being processed in a slightly different manner to economize on equipment requirements.

The overlapped signals in the −2 kHz to +2 kHz portion of the spectrum (and the corrsponding signals in the 110–114 kHz portion of the spectrum) are then modulated in modulator 57 by the cosine of the frequency of the wanted carrier less 2 kHz and in modulator 58 by the sine of the wanted carrier less 2 kHz. For example, consider channel 1 which occupies the 104–108 kHz slot in the spectrum of the frequency division multiplex carrier. The mirror image of this frequency slot, taken about ½ $F_{S2}=$kHz, occupies a 4–8 kHz frequency slot; thus, the desired carrier frequency for oscillators 61 and 62 in modulator 56 is 6 kHz, that is, 8 kHz −2 kHz. Accordingly, switch 63 is set to 6 kHz when it is desired to process channel 1 in multipliers 57 and 58, to 10 kHz when processing channel 2, and so on. The signal in the upper and lower paths of modulator 56 are then summed in adder 66 to produce the desired single-sideband signal in the appropriate frequency slot for the channel being processed.

Before discussing the operation of the circuit shown in FIG. 3 further, it should be pointed out that to reduce the amount of hardware required to effectuate the T and L conversion, the Weaver modulator is adapted to simultaneously process two channels, e.g., channels 1 and 12, 2 and 11, and so on. To that end, the channels which occupy the six lowest frequency slots in the spectrum of the FDM carrier system, that is to say channels 7 through 12, are modulated by the frequency corresponding to one-half of the sampling frequency $F_{S2} = 112$ kHz. This shifts the overlapped upper and lower sideband signals from the positions shown in graph (f) to that shown in graph (g); that is to say, the signal formerly occupying the −2 kHz to +2 kHz portion of the spectrum now occupies the 54–58 kHz portion of the spectrum. The modulation by 56 kHz is advantageously accomplished by altering the sign of alternate samples in the signal, for example, in modulator 52. Thus, when the unmodulated and modulated signals are summed, as shown in graph (h), they may be simultaneously processed in modulator 56.

Graph (h) depicts the combined overlapped sideband signals for channels 1 and 12. However, these signals do not yet have the frequency relationship necessary for placement in the FDM frequency spectrum, nor are they yet in suitable form since they comprise two overlapped sideband signals. It is for these reasons that the combined signals are modulated in the second set of modulators in the Weaver modulator with a frequency of 6 kHz, which, as shown in graphs (i) (upper branch) and (j) (lower branch), shifts the channel 1 signal 6 kHz to the right and the channel 12 signal 6 kHz to the left. Apart from the frequency translation, the signals in the upper branch of the Weaver modulator, that is those signals which are modulated by the cosinusoidal function of 6 kHz, are unchanged but, in accordance with the known properties of a Weaver modulator, in the lower branch the sign of the lower sideband signal is inverted; thus, when the signals in the two branches are combined in adder circuit 66, the lower sidebands are canceled and only the upper sidebands remain. Of course, exactly the opposite happens in that portion of the frequency spectrum which folded about ½ $F_{s2}$ = 56 kHz. That is, in the 56–112 kHz portion of the spectrum, the upper sidebands are canceled leaving only the lower sideband signals, which now occupy the desired frequency slots in the basic group signal.

Graph (k) of FIG. 4 shows in the 0–56 kHz portion of the band, the upper sideband corresponding to channel 1, which extends from 4–8 kHz, and the upper sideband corresponding to channel 12, which extends from 48–52 kHz. When the mirror image of these signals ½ $F_{s2}$ = 56 kHz is considered, channel 1 will be seen to be a lower sideband signal extending from 104 kHz to 108 kHz, which is the correct slot for channel 1 in an LMX1 group signal, and channel 12 will be seen to be a lower sideband signal extending from 60–64 kHz, which is correct for channel 12. Graphs (l), (m), (n), (o) and (p) respectively depict the situation when switch 63 is set to 10, 14, 18, 22 and 26 kHz and, as can be seen, in an analogous manner the sideband signals correponding respectively to channels 2 and 11, 3 and 10, 4 and 9, 5 and 8 and 6 and 7 will be translated to the correct slots in the spectrum of the FDM carrier.

The several time-division multiplexed single-sideband signals are next combined in channel accumulator 67 to yield the frequency-division multiplexed signal shown in graph (q). Graph (r) of FIG. 4 depicts the characteristics of the analogue bandpass filters 47 and 49 in interface circuit 33 (FIG. 2); thus, after D-to-A conversion 46 or 47 and filtering in filters 47 and 49, the desired basic group signal shown in graph (s) is obtained.

As previously discussed, the incoming pulse code modulated signal is modulated by a frequency of 14 kHz prior to filtering in low-pass filters 101, 102; 111, 112. The modulation by 14 kHz can be accomplished by merely alternating the signs of the signal two samples at a time or by multiplying by a sequence 1, 1, −1, −1, 1, 1, −1. This is because the values of the cosine and sine functions are 1, 0, −1, 0, 1, 0, −1, 0 . . . and 0, 1, 0, −1, 0, 1, 0, −1 . . . , respectively. Also, as previously mentioned, the increase in the sampling rate from 56 kHz to 112 kHz may be obtained by introducing a zero after each sample taken. Thus, only four, third order, digital filters are required, i.e., filters 101, 102, 111 and 112. To summarize, in the operation of the circuitry shown in FIG. 3, the equipment required to effect a T/L conversion with a hardware speed of 26.88 megabits/second and a 20-bit word length is one fourteenth order, symmetrical bandpass filter, four third order low-pass filters, two sign units, two adders, and a channel accumulator.

Unfortunately, the above-described T/L conversion process is not reversible. Thus, the technique for converting analogue FDM signals into digital TDM signals is not the inverse of the digital-to-analogue conversion process. One major difference is that a fourteenth order, semi-symmetrical, digital bandpass filter is employed rather than the symmetrical, filter employed in the embodiment of the inversion disclosed in FIG. 3. The reason for this is that A-type channel banks, for example the A6 channel bank assumed in the illustrative embodiment of the invention, require a second order, voiceband equalizer to compensate for the low frequency shaping that the channel filters create. In the L/T converter described below, this equalizer is incorporated in the bandpass filter so that the equilizer per se may be eliminated. Another difference is that two channels are simultaneously processed in the Weaver modulator portion of the processor.

Figure 5:
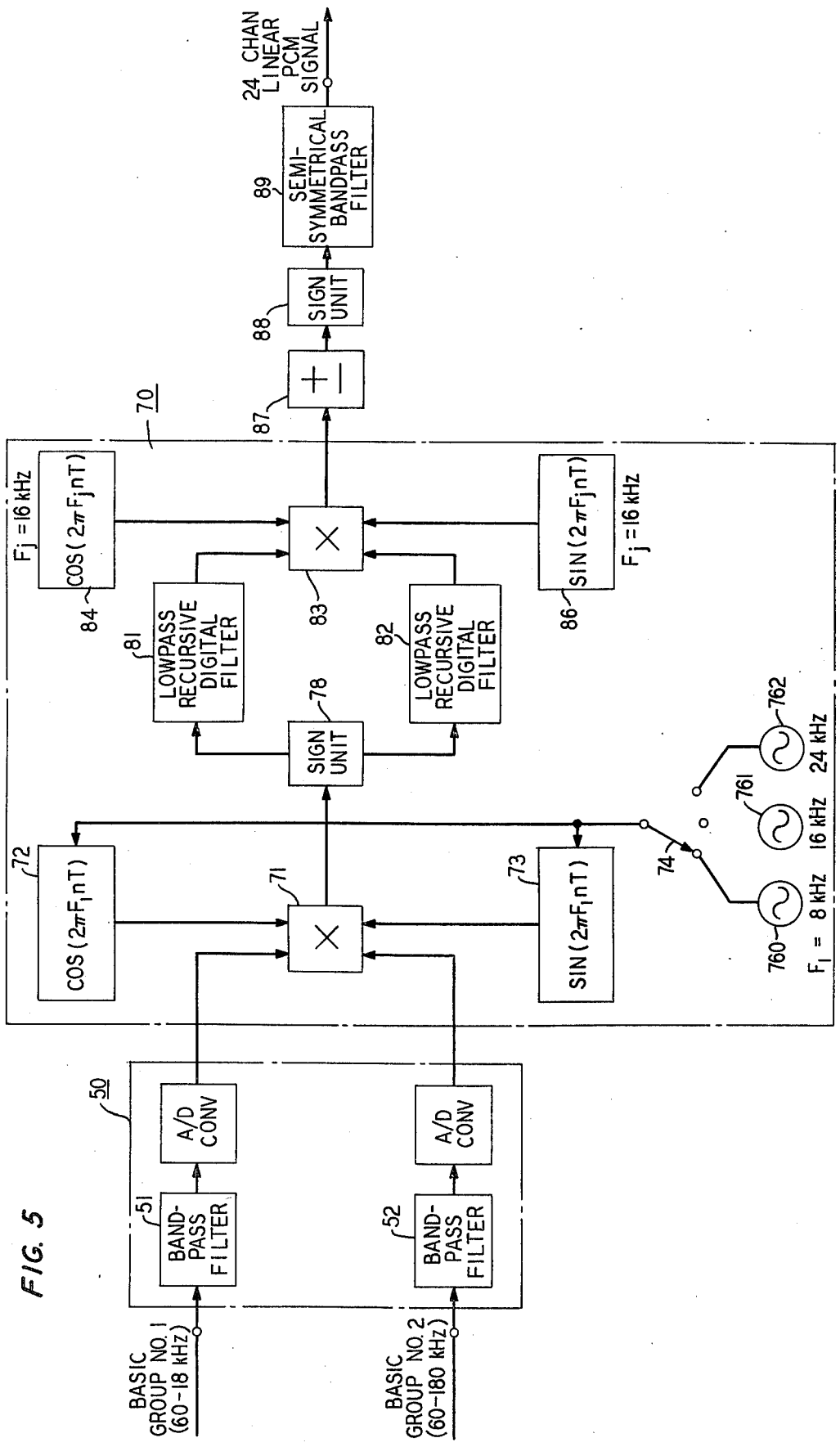
FIG. 5 is a block schematic diagram of the analogue-to-digital portion of the circuitry shown in FIG. 2.

FIG. 5 depicts the circuitry of an illustrative L/T converter according to the invention. The two incoming basic group signals each comprise twelve 4 kHz FDM single-sideband signals and occupy the 60–108 kHz portion of the frequency spectrum. These group signals are applied to and filtered in bandpass filters 51 and 52 of analogue interface circuit 50. Filters 51 and 52 each have a stopband from 0–52 kHz and from 116 kHz upwards to avoid the possibility of aliasing in the A/D conversion.

The output of filters 51 and 52 are respectively connected to A/D converters 53 and 54 at a sampling rate $F_{S2}$ = 112 kHz. Each basic group signal is, thus, sampled, digitalized, and time-division multiplexed. The multiplexed signals are next forwarded to a demodulator which comprises a Weaver modulator 70 and a semi-symmetrical bandpass filter 89.

Weaver modulator 70, which includes a first and second set of modulators 71 and 83, respectively, also has an upper and lower branch and is, thus, similar to the Weaver modulator shown in FIG. 3. The upper branch connects to and is modulated by the output of a cosine oscillator 72, while the lower branch is similarly connected to the output of a sinusoidal oscillator 73. Oscillators 72 and 73 are both selectively driven, via an electronic switch 74, by the output of a plurality of oscillators $76_0$ –$76_2$ respectively having the frequencies 8 kHz, 16 kHz and 24 kHz in the illustrative embodiment of the invention.

As previously mentioned in connextion with FIG. 3, the arrangement shown for supplying the 8, 16 and 24 kHz signals to modulator 71 is only diagrammatic. Any of several known techniques may be employed to supply the cosinusoidal and sinusoidal frequencies to modulator 71.

The output of modulator 71 is connected to a sign unit 78, thence, to first and second, third order, low-pass, recursive, digital filters 81 and 82. The output of filters 81 and 82 is connected to a modulator 83 which is driven in its upper branch by a cosine oscillator 84 and in its lower branch by a sine oscillator 86, each having a fixed frequency of 16 kHz in the illustrative embodiment. The sampling rate going into filters 81 and 82 is $F_{S2} = 112$ kHz; however, at the output of the filters this sampling rate is reduced to $F_{S1} = 56$ kHz; thus, modulator 83 operates at the 56 kHz rate. The output of modulator 83 is connected to an adder/subtractor circuit 87, thence, to a fourteenth order, semi-symmetrical, digital, bandpass filter 89, via a sign unit 88.

Figure 6:
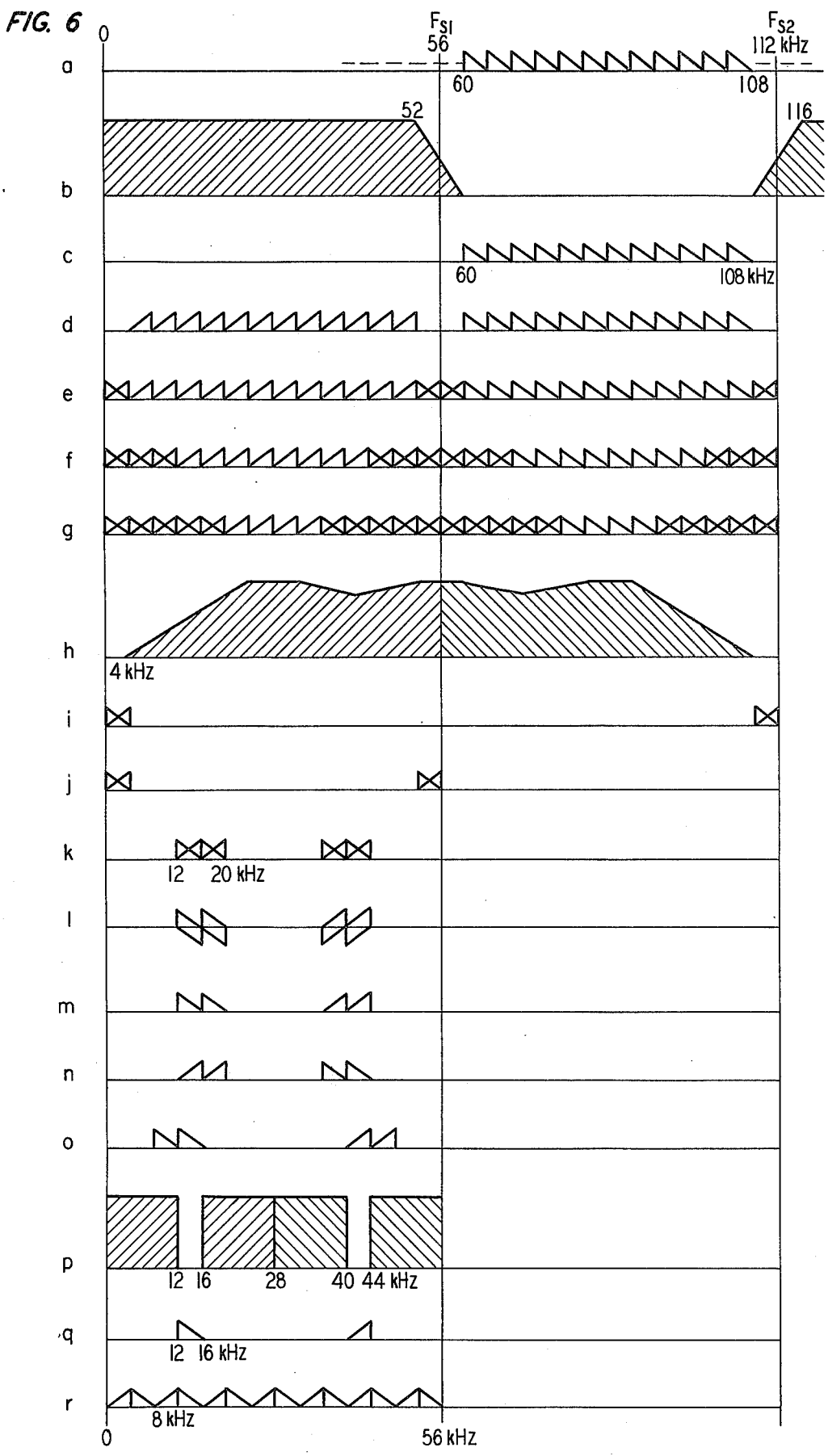
FIG. 6 is a series of graphs depicting the spectra of signals found at various locations in the circuitry shown in FIG. 5.

The operation of the circuit shown in FIG. 5 is best explained with reference to FIG. 6 which depicts the frequency spectra at various locations within the circuitry shown. Graph (a) of FIG. 6, for example, shows the basic group signal prior to conversion and, as previously discussed, this signal comprises twelve, suppressed-carrier, frequency-division multiplexed, single-sideband signals each 4 kHz wide, the total group signal occupying the 60–108 kHz portion of the frequency spectrum. Assuming that this group signal has been transmitted over some communication facility there will also be a certain degree of noise and part of the adjacent group signal superimposed on the desired signal and such noise will extend below 60 kHz and above 108 kHz. This is depicted by the dashed line in graph (a). Graph (b) of FIG. 6 depicts the (idealized) characteristic of bandpass filters 51 and 52 and, as can be seen, these filters have a passband beginning at approximately 60 kHz and ending at 108 kHz. Graph (c) represents the spectrum of the FDM basic group signal after it has been filtered in filters 51 and 52. As can be seen, the unwanted noise has been eliminated which is important if, as previously mentioned, aliasing is to be avoided. Graph (c) of FIG. 6 depicts the frequency spectrum at the output of the A/D converters. Because the A/D conversion is effected at a sampling rate of $F_{S2} = 112$ kHz the basic group signal extending from 60–108 kHz will be folded about the 56 kHz line to accupy both the 4–52 kHz and the 60–108 kHz portions of the frequency spectrum. Of course, the sideband orientation of each FDM channel in the basic group signal is reversed in the lower portion of the band. That is to say, what were lower sidebands in the 60–108 kHz portion of the band will become upper sidebands in the 4–52 kHz portion of the band. Graph (e) of FIG. 6 depicts the spectrum present at the output of the first set of modulators of Weaver modulator 70 after the passband signal has been modulated by the cosinusoidal and sinusoidal functions of the frequency of 8 kHz.

It will be recalled that the ordering of the channels in the basic group signal is such that the highest frequency slots bear the lowest channel numbers. Accordingly, after the signal has been folded about the 56 kHz line, channel 1 will occupy the 4–8 kHz frequency slot; channel 2 will occupy the 8–12 kHz frequency slot, and so on. The modulation of the basic group signal by a frequency 8 kHz in the modulator 71 thus displaces all the chanels in the group signal to the left by 8 kHz and results in the overlapped spectrum of channels 1 and 2 occupying the 0–4 kHz portion of the spectrum, as shown at the extreme left of graph (e). The modulation by 8 kHz simultaneously displaces the signal corresponding to channels 11 and 12 to the right by 8 kHz causing the spectrum of these channels to be overlapped in the 52–56 kHz portion of the spectrum.

When switch 74 connects the 16 kHz signal to oscillators 72 and 73, channels 3 and 4 become the channels that are overlapped in the 0–4 kHz portion of the spectrum, while channels 9 and 10 become the channels which are overlapped in the 52–56 kHz portion of the spectrum. Returning to graph (e), channels 1 and 2 and channels 11 and 12 are simultaneously being overlapped in other portions of the spectrum, but this is not relevant to an understanding of the conversion process and may be disregarded.

In like fashion, when the modulator 71 is supplied with the 24 kHz signal from oscillator $76_2$, the 0–4 kHz portion of the spectrum will be occupied by overlapped sideband signals representative of channels 5 and 6, while overlapped signals representative of channels 7 and 8 will occupy the 52–56 kHz portion of the spectrum. Of course, all of these signals are appropriately time-division multiplexed.

We so far considered the process by which channels 1 and 2 are obtained and have seen that the procedure for obtaining channels 3 and 4 and 5 and 6 is essentially identical. The procedure for obtaining channels 7 through 12 is also entirely analogous except that the sign of successive samples for each channel is alternated before the samples are filtered in filters 81 and 82. The alternation of the samples is accomplished by multiplying the samples by the sequence 1, −1, 1, −1 . . . in sign unit 78. This is equivalent to modulating channels 7 through 12 with a frequency of 56 kHz, that is, one-half of the sampling rate $F_{S2} = 112$ kHz. This modulation shifts the superimposed upper and lower sidebands present in the 52–56 kHz frequency slot to the 0–4 kHz frequency slot so that they may be processed in the same manner, and by the same hardware, in which channels 1 through 6 are processed.

Turning our attention again to the processing of channels 1 and 2, the output of modulator 71 is connected to either filter 81 or 82, both of which filters have the characteristic shown in graph (h) of FIG. 6. As can be seen, filters 81 and 82 suppress signals in the frequency range 4–108 kHz. In particular, filters 81 and 82 have high insertion loss over the frequency ranges 24–32 kHz and 52–56 kHz, that is to say, over the 8 kHz band centered about 28 kHz, which is one-half of the second sampling frequency $F_{S1} = 56$ kHz, and the 8 kHz band centered about 56 kHz, which is one-half the sampling frequency $F_{S2} = 112$ kHz. Of course, it is precisely in these frequency bands that the maximum filtering is needed.

Graph (i) depicts the results of filtering the spectrum shown in graph (e) in filters 81 and 82 and, as can be seen, the overlapped sideband signals representative of channels 1 and 2 in the 0–4 kHz band, and the corresponding mirror image in the 108–112 kHz band, are the only signals remaining. The overlapped sideband signals representative of channels 11 and 12 which occupy the frequency band 52–56 kHz, in particular, are strongly suppressed, as are the signals in the frequency range of 4–52 kHz representing channels 3–10. At the output of filters 81 and 82, the sampling rate is reduced from $F_{S2} = 112$ kHz to $F_{S1} = 56$ kHz, for example, by dropping every other sample. This results in the spectrum shown in graph (j) which is similar to graph (i) except that the mirror image of overlapped channels 1 and 2 previously occupying the frequency spectrum from 108–112 kHz is shifted 56 kHz to the left to occupy the 52–56 kHz portion of the spectrum.

The sideband signals are now modulated in modulator 83 by the sine and cosine of 16 kHz. The result of the modulation by the cosine function is shown in graph (k). As can be seen, the overlapped sideband signals representative of channels 1 and 2 occupying the 0–4 kHz portion of the band are displaced to the right by 16 kHz to occupy the frequency band 16–20 kHz. Although not shown in graph (j), there is also exists the mirror image of the overlapped channels 1 and 2 folded about the 0 axis and extending from 0 to -4 kHz. This signal component also appears in graph (k) and occupies the 12–16 kHz band. It will be notes that the orientation of the overlapped sidebands in this second signal is the inverse of those contained in the first signal. Graph (i) of FIG. 6 depicts the result of modulating the overlapped sideband signals by the sine function of 16 kHz and is similar to that shown in graph (k) except that the phase of one of each of the overlapped pairs of channels is inverted. Graph (m) depicts the spectrum that occurs when the signals shown in graph (k) and (l) are summed in adder 87. Because of signal cancellation, after the signals are combined the channel 1 sideband occupies the 16–20 kHz band and, thus, can be discriminated from the channel 2 signal which occupies the 12–16 kHz portion of the band. Ignoring, for the moment, the effect of sign unit 88, graph (p) shows the (idealized) response of the fourteenth order, digital, bandpass filter 89 which, as can be seen, blocks all signals other than those falling within the bandpass region which extends from 12–16 kHz. Since this is precisely the portion of the band which is occupied by the sideband signal corresponding to channel 2, channel 2 is separated from channel 1 and, of course, all other channels in the FDM system, as shown in graph (q). Accordingly, if the sampling rate is next reduced from $F_{S1} = 56$ kHz to $F_{ST} = 8$ kHz, for example by dropping six out of every seven samples, the spectrum of the desired time-division multiplexed signal will be obtained as shown in graph (r).

Considering now the procedure to obtain channel 1, it will be noted that in graph (m), where the signal shown in graphs (k) and (l) are added, the signal corresponding to channel 1 has the desired orientation, that is to say it is a lower sideband signal, but occupies the wrong frequency slot. On the other hand, when circuit 87 is employed as a subtractor and the signal shown in graph (k) is subtracted from the signal shown in graph (l), the spectrum shown in graph (n) is obtained. Clearly, the order in which the channels appear in graph (n) is the opposite of that shown in graph (m), that is to say, the signal representative of channel 1 now occupies the desired 12–16 kHz portion of the spectrum so that it is in a position to be filtered by filter 89; however, the orientation of the signal is wrong, that is to say it is now an upper sideband signal. Accordingly, by alternating the sign of the signal samples in sign unit 88 the channel 1 signal is folded about the 14 kHz ordinate so that, as shown in graph (o), it assumes both the desired orientation and the desired position may thus be filtered in filter 89 to yield the desired signal shown in graph (q). As discussed earlier with reference to FIG. 2, the output of filter 89 is then connected to the digital interface circuit for further processing to form the 8-bit, compressed PCM signal desired for transmission over the T1 System.

Figure 7:
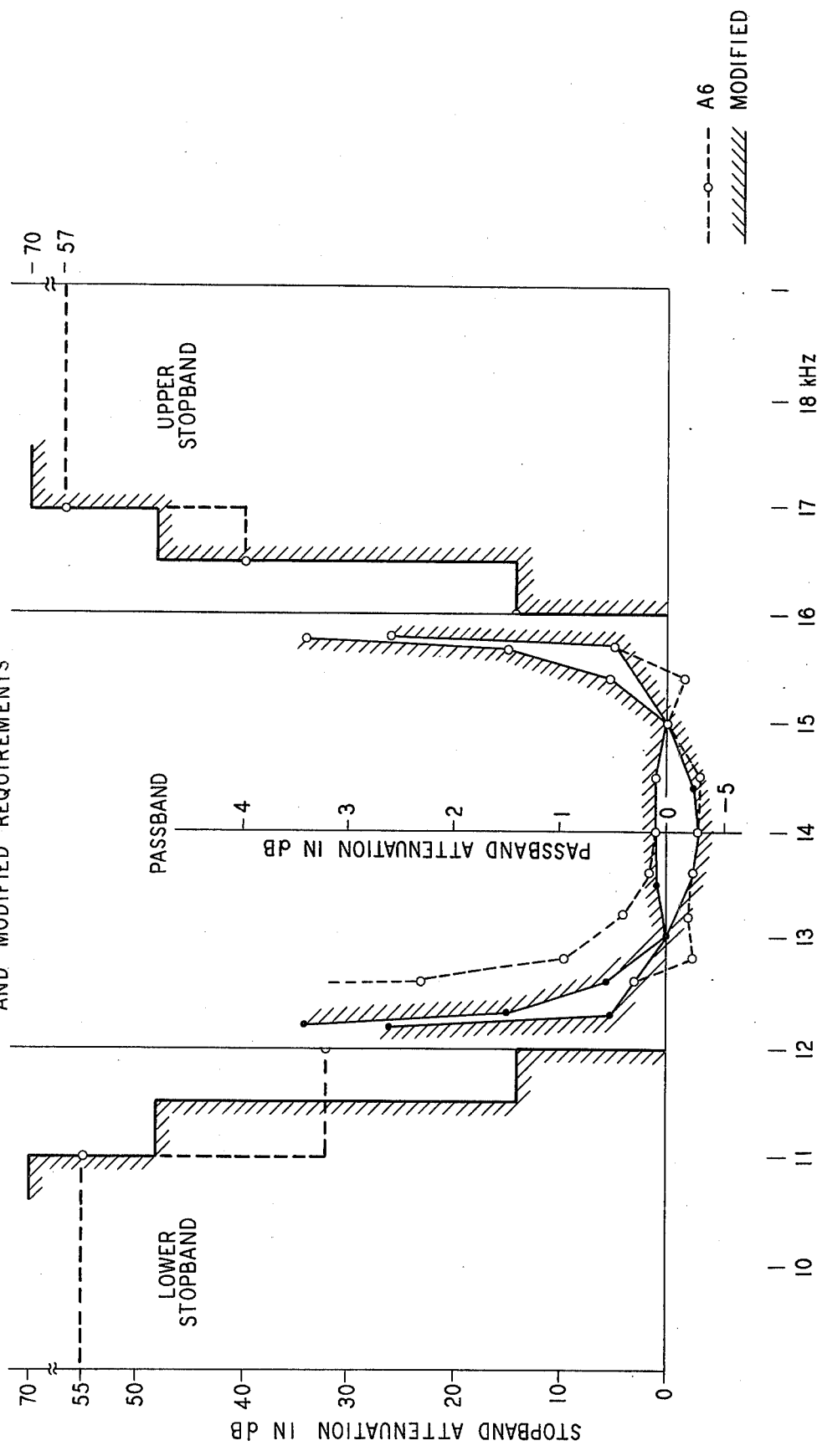
FIG. 7 is a graph showing te response desired for the filters employed in the circuitry shown in FIGS. 3 and 5.

Because the signals generated in the T/L and L/T converter circuits of this invention will be respectively interfaced with a D-type channel bank at one end of the circuit and an A-type channel bank at the other end, these signals have to be compatible with those ordinarily received by these channel banks. It is especially important that the circuit characteristics should match those of an A-type channel bank. The specifications for the digital filters employed in the T/L connector are therefore derived from the present filter requirements for an A-type channel bank, specifically the A-6 channel bank, which requirements are shown in FIG. 7.

Figure 9:
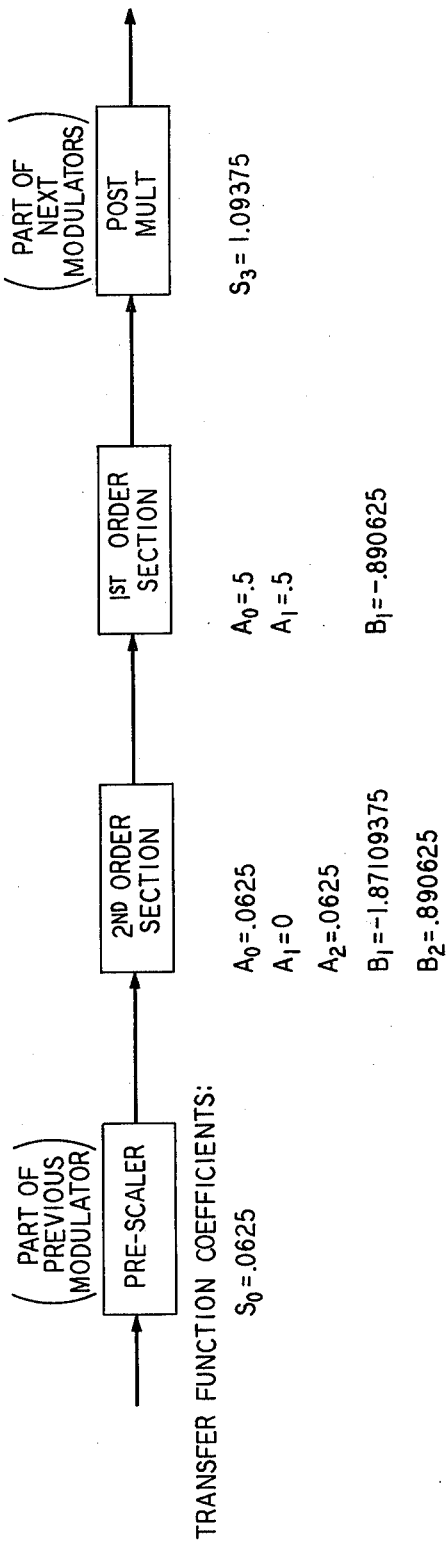
FIG. 9 is a block schematic diagram of an illustrative recursive filter of a type that may be employed in the circuitry shown in FIG. 3.

We will first consider the design of the third order, digital filters 101, 102; 111, 112 shown in FIG. 3, which filters are of course employed in the conversion in the T/L direction. Because the order of these filters is only three, in the illustrative embodiment of the invention, they were designed to achieve the performance shown in FIG. 8. As previously discussed, the sampling frequency of these filters is $F_{S2} = 112$ kHz. FIG. 9 depicts one of these filters in greater detail, together with the gain of the amplifiers employed therein. It will be noted that the configuration of this filter, per se, is entirely conventional and is similar to the digital filters discussed and shown in Introduction to Digital Filtering by R. E. Bogner and A. G. Constantinides, John Wiley & Sons, New York, 1975 and Digital Filters by M. H. Ackroyd, Butterworths, Ltd., London, 1973. See also Sammelband der Seminarvortrage uber Digitale Filter Institut Fur Technische Physik an der ETH, Zurich, Switzerland, 1969.

The fourteenth order, symmetrical, digital bandpass filter 51 shown in FIG. 3 was designed by realizing an elliptic filter on the pre-warped critical frequencies, using a known per se computerized pole placing program. The resulting transfer function in the S-domain was transformed into the Z-domain by using a computerized bi-linear transformation program. The requirements of the filter were then tailored to the characteristics of the A-type channel filter shown in FIG. 7 incorporating also the response of filters 101, 102, 111 and 112. The filtering requirements at the carrier frequencies are relaxed somewhat from that experienced with the analogue channel filters customarily employed in A-type channel banks since carrier leakage in a digital modulator is almost zero. In the illustrative embodiment the stopband requirment was set at 70 dB except in the frequency range which is 1 kHz away from the carrier where staircase requirements were used. The filter parameters obtained from the bi-linear transformation program were than applied to a general purpose optimization program to satisfy the shape requirements. In the illustrative embodiment of the invention disclosed and described herein, it was found that a fourteenth order filter having a coefficient word length of 9-bits plus a sign bit was sufficient to satisfy these requirements.

Figure 10:
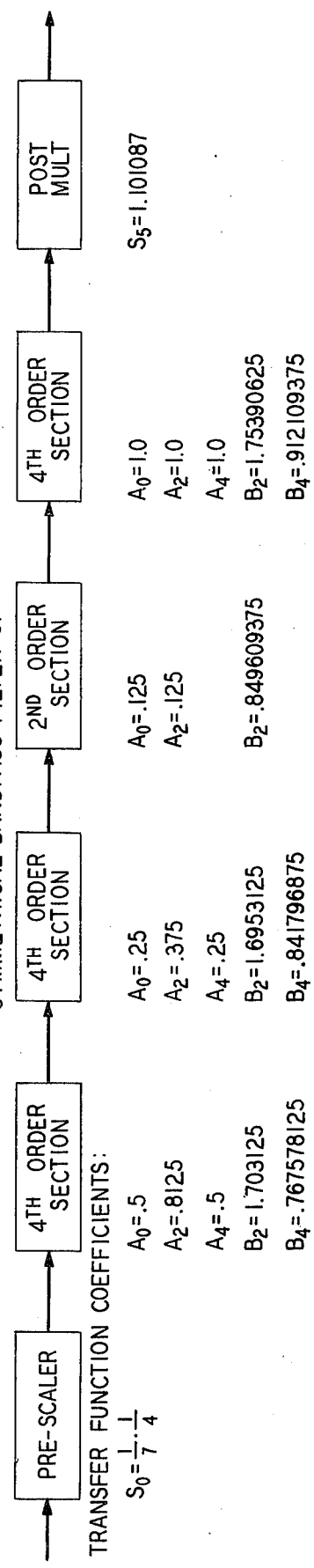
FIG. 10 is a block schematic diagram of an illustrative symmetrical bandpass filter of a type that may be employed in the circuitry shown in FIG. 3.
Figure 11:
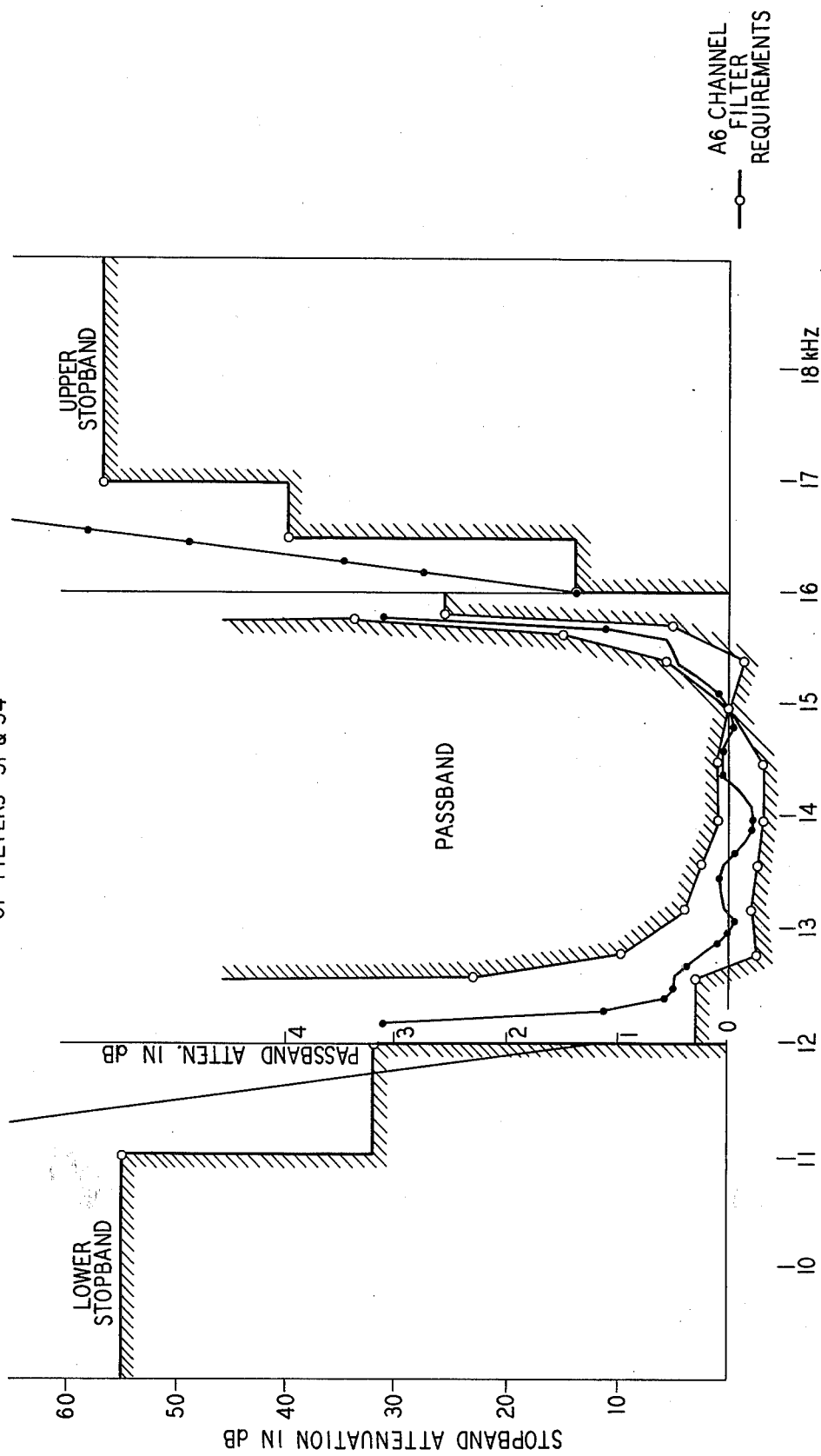
FIG. 11 is a graph showing the conbined response of the filters shown in FIGS. 9 and 10.

As previously discussed the sampling rate of filter 51 is $F_{S1} = 56$ kHz and FIG. 10 depicts, in block schematic form, the configuration of this fourteenth order digital filter together with the coefficients of the amplifiers employed therein. Filter 51 is a symmetrical bandpass filter so that the transfer function is defined in terms of $Z^{-2}$ instead of $Z^{-1}$. Its physical configuration looks exactly the same as a seventh order, high-pass, digital filter which employs a 28 kHz sampling rate. FIG. 11 depicts the combined frequency response of filter 51 and filters 101, 102, 111 and 112 with a passband translated into the 12–16 kHz range, as shown for example in graph (b) of FIG. 4.

Figure 12:
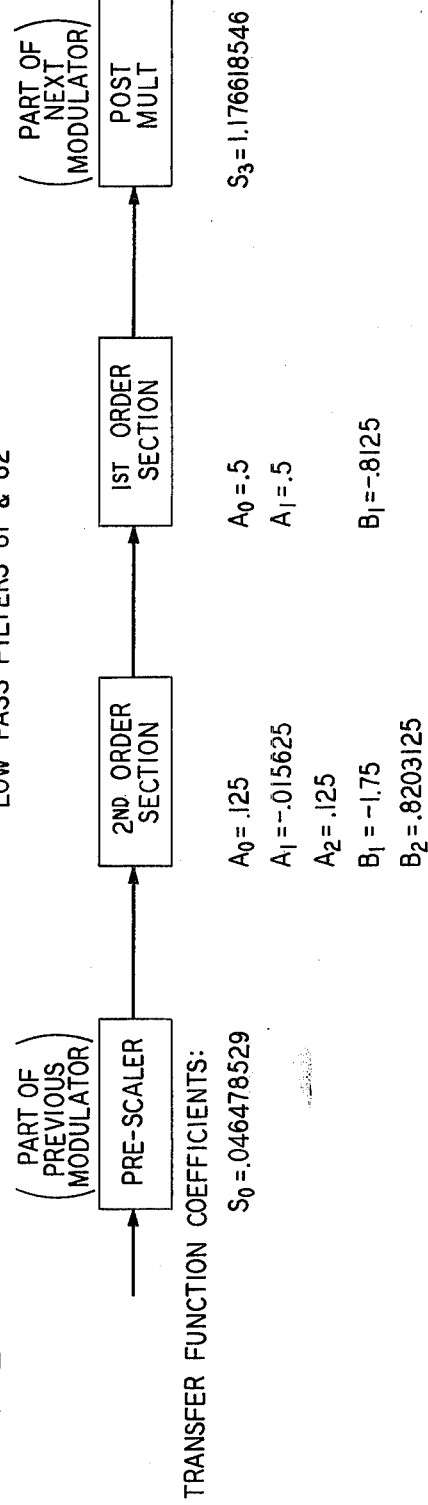
FIG. 12 is a block schematic diagram of an illustrative low-pass filter of a type that may be employed in the circuitry shown in FIG. 5.
Figure 14:
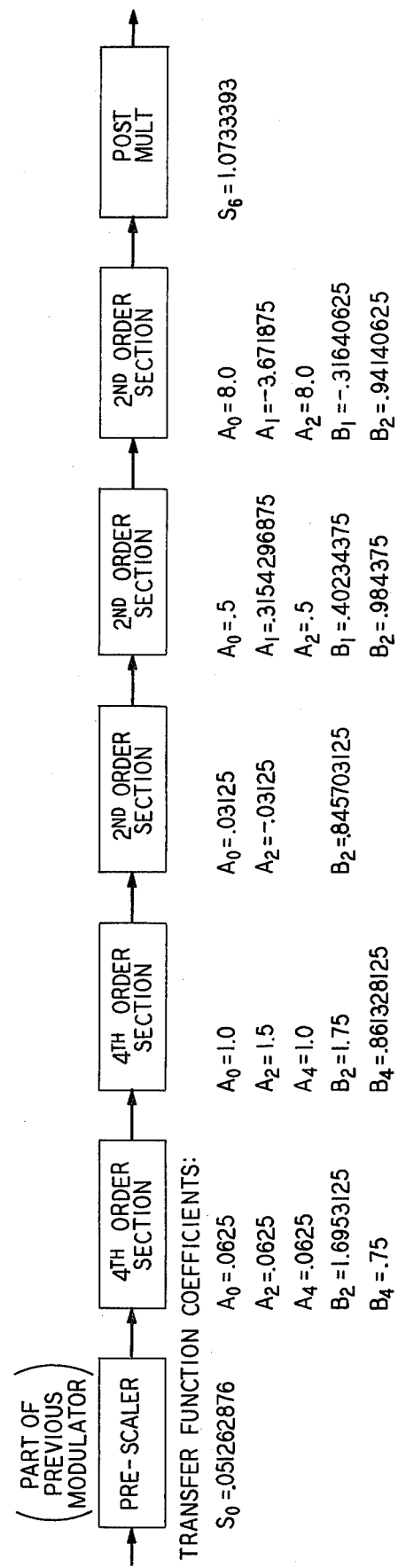
FIG. 14 is a block schematic diagram of an illustrative semi-symmetrical bandpass filter of a type that may be employed in the circuitry shown in FIG. 5.

Turning now to FIG. 5, for conversion in the L/T direction because two channels are simultaneously processed in the Weaver modulator portion of the demodulator, the bandwidths of the low-pass filters must be wider than those required in the T/L direction. A much higher order than an eighth order filter would be required if a non-recursive design were employed. It has been discovered, however, that a third order low-pass filter of recursive design is sufficient and accordingly in the illustrative embodiment filters 81 and 82 are of this type. FIG. 12 depicts in block schematic form the third order recursive filter discussed. In the illustrative embodiment this filter employs a coefficient work length of 7 bits plus a sign bit. As shown in FIG. 5, the sampling rate of filters 81 and 82 is 112 kHz and the response that these filters must have is shown in FIG. 13. The design of semi-symmetrical, digital, band-pass filter 89 was obtained in a manner which is similar to that employed to design filter 51 in FIG. 3. As previously discussed, because a voiceband equalizer is required at the receiving end of an A-type channel bank, the passband of filter 89 had to be shaped to meet the overall looped requirements. To accomplish this, one of the fourth order sections which produces the transmission zeros nearest to the cut-off frequency was broken up into two second order sections. Employing the general purpose optimization program previously discussed, the fourteenth order semi-symmetrical band-pass filter shown in FIG. 14 was obtained. This filter requires a coefficient word length of 9 bits plus a sign bit and, as shown in FIG. 5, operates at the sampling rate $F_{S1} = 56$ kHz.

Figure 15:
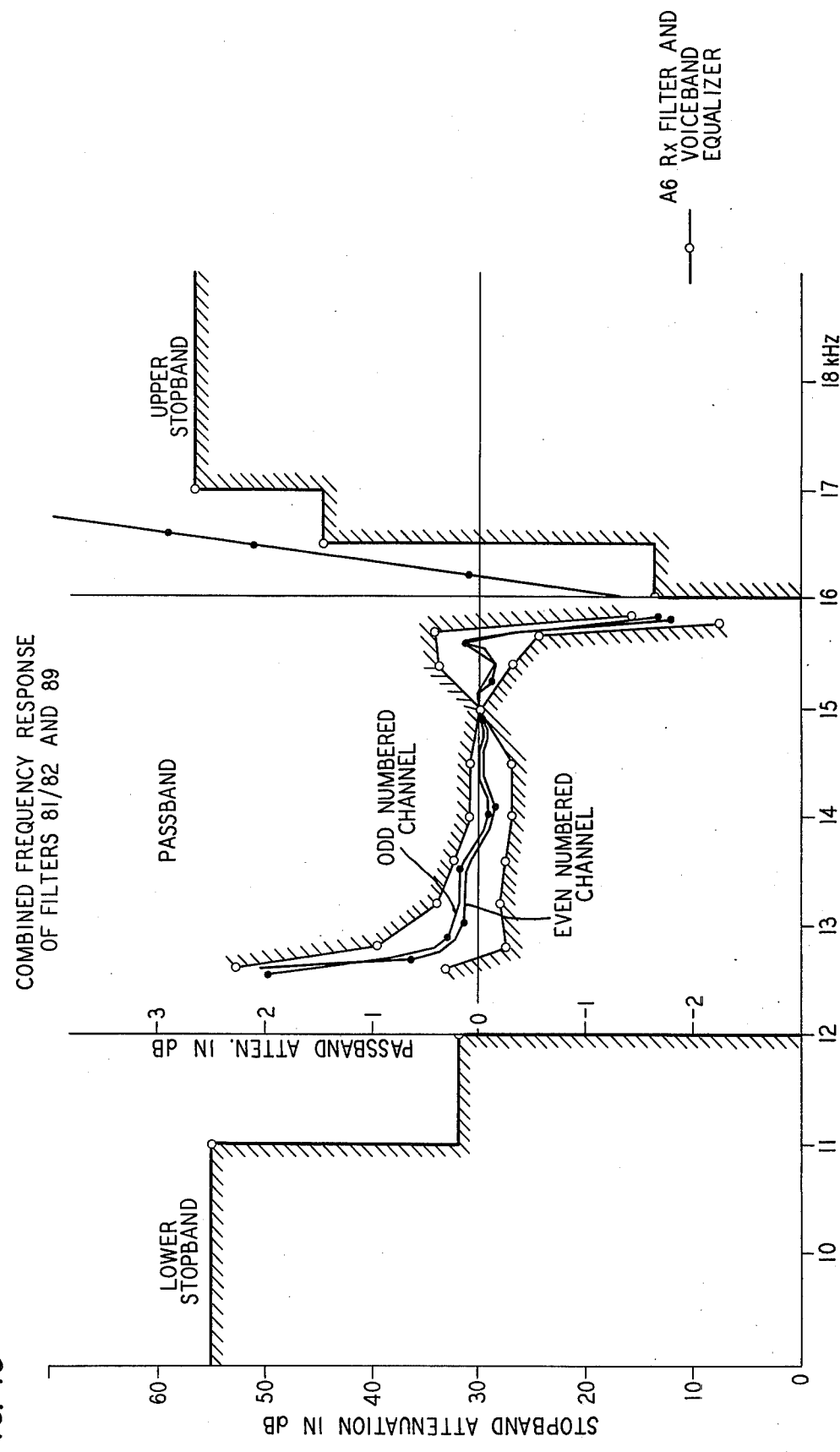
FIG. 15 is a graph showing the combined passband response of the filters shown in FIGS. 14 and 12.
Figure 16:
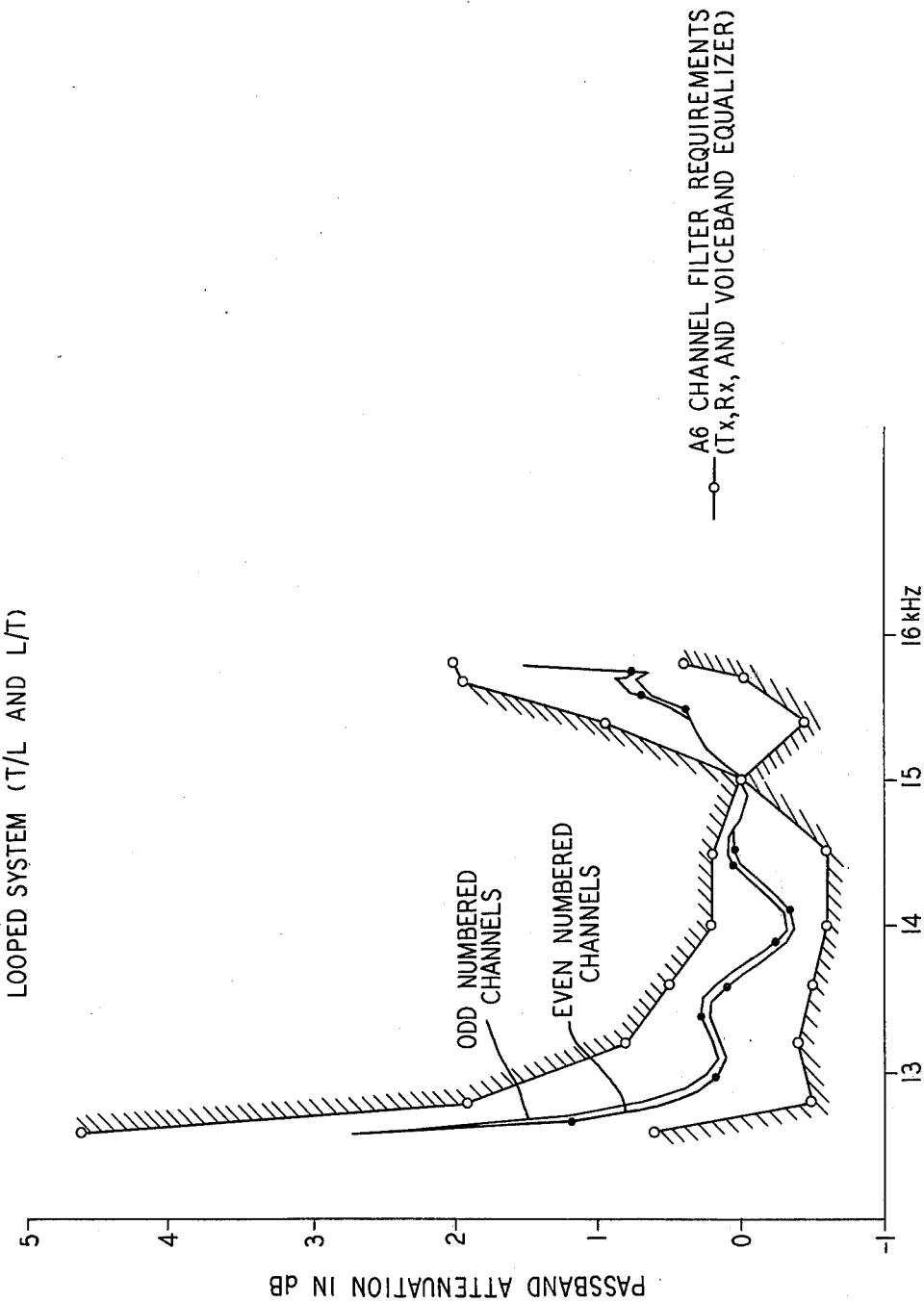
FIG. 16 is a graph showing the passband frequency response of the looped system including both the T/L and L/T conversion portion of the apparatus.

FIG. 15 depicts the combined frequency response of filters 81 and 82 and filter 89. The overall looped passband response is shown in FIG. 16 and this response satisfies the requirements of the system.

The word length of the filters such as filter 89 will now be considered. The output of digital expandor 36 in FIG. 3 for a compressed, 8-bit T1 signals with $\mu = 255$ requires a linear 14-bit representation. The voice channel noise requirement for a D-type channel bank is 23 dBrnc0 (one way, both ends), while the overload power requirement is $+3$ dBm0 (sine wave). Therefore, if the noise contribution from each end of the system is assumed to be the same, the noise requirement per channel bank is 20 dBrnc0. This leads to the minimum equivalent word length required, as follows:

$$(88 - 20 + 3 - 1.8)/6 = 11.53 \simeq 12 \text{ bits.}$$

If a 12-bit significant word length is employed, the noise per channel bank will therefore be:

$$88 - 12 \times 6 + 3 - 1.8 = 17.2 \text{ dBrnc0.}$$

This, then, is the noise obtained from digital expandor 36 with the output rounded to 12-bits. The noise due to the quantization in the filters is another major noise contributor. The noise due to the quantization in the multipliers and scalers of filter 51 was found to be about 35 dB above the signal rounding source for the message band occupying the 12–16 kHz portion of the spectrum. For an additional 7-bits in the word length the increase in the noise may be found from the following equation:

$$35 \text{ dB} * 42 \text{ dB} -42 \text{ dB} = 0.8 \text{ dB}$$

where * indicates the power addition. The total noise is therefore 18 dBrnc0 and the total word length is 19-bits.

If the significant word length of digital expandor 36 is rounded to 13-bits and if the total word length remains 19-bits, the total noise then becomes 13.74 dBrnc0. Finally, if the full 14-bit significant word length is used with a 19-bit total word length, the total noise becomes 11.4 dBrnc0. Therefore, the internal data word length of 19-bits for filter 51 is sufficient. If this word length is employed throughout the system, the noise contribution due to filters 101, 102, 111 and 112 and the modulator is negligible.

As previously discussed, two set of modulators are employed in each direction of transmission. Each set consists of two modulators with he modulating carrier having a quadrature phase difference, the carrier in the upper path leading that of the carrier in the lower path. Considering first the T/L direction (FIG. 3), the first set of modulators, modulator 52, consists of the carrier samples 1, 0 and −1 only and, as mentioned previously, advantage can be taken of the zero values. That is to say, only one sign unit which atlernates the sign of the samples in consecutive pairs of samples is required. The second set of modulators in the T/L direction, that is to say modulators 57 and 58, are energized by six carrier frequencies, i.e., 6, 10, 14, 18, 22 and 26 kHz at the sampling rate of $F_{S2} = 112$ kHz. Since these frequencies are all integer multiples of 2 kHz, the instantaneous sample values of these carriers may assume the sample values of the 2 kHz sine function. Now, for a 2 kHz sine function sampled at 112 kHz there are 56 samples in each period. If we use the sample values of sine $(i\theta - \theta/2)$, where $i = 1, 2, 3 \ldots 56$ and $\theta = 2\pi/56$, then only 14 samples in absolute values and corresponding signs need be stored in the system. Both modulators in the upper (cosine) and lower (sine) paths can use the same stored values. Since the same quantized sample values are used in both paths, the amplitude of the cosine and sine functions are identical. This is very critical if good cancellation of unwanted sidebands within the message band is to be achieved. With a sample word length of 12-bits, plus a sign bit, the most significant harmonic is 89.3 dB below the fundamental for all of the carrier frequencies; the spectra for these carrier are shown in FIG. 17.

Considering now conversion in the L/T direction, there are three carriers of 8 kHz, 16 kHz and 24 kHz required for the first pair of modulators which are, of course, sampled at $F_{S2} = 112$ kHz. On the other hand, only one 16 kHz carrier is required for the second set of modulators 83 which are sampled at the rate $F_{S1} = 56$ kHz. Clearly, for modulator 71 a new set of sample values is required. If the sample values of a 2 kHz sign function were used, as in the case of the T/L conversion, the harmonic contents of the cosine and sine functions will be quite different. In the 16 kHz carrier case the most significant harmonic content in one function is found to be only 82.7 dB down, compared with 88.2 dB down in the other function. This is caused by the fact that the functions assume two different set of values, that is to say, two mutually exclusive set of seven values out of 14 values. To overcome this problem, that is, to force the sine and cosine functions to assume the same values, the value corresponding to sine $(\pi/4)$ and cosine $(\pi/4)$ was used as the starting sample. Under these circumstances both cosine and sine functions assume the same set of sample values.

The spectra of these carriers with a 13-bit word length, 12-bits plus a sign bit, are shown in FIG. 18. As can be seen, the most significant harmonic is 90.9 dB below the fundamental. The 16 kHz carrier employed in modulator 83 at the 56 kHz sampling rate is generated in the same way as previously discussed. Here, the most significant harmonic is 91 dB below the fundamental. Since the sampling rate of modulator 83 is one-half of that employed in modulator 71, one modulator, physically a digital multiplier, can be time-shared by both cosine and sine functions. The spectrum of this carrier is shown in FIG. 19 and the word length employed is also 12-bits plus a sign bit.

The digital word lengths of A/D converters 53 and 54 in FIG. 5 and D/A converters 46 and 47 in FIG. 3 are determined primarily by the noise requirement of he D-type channel bank since the noise in a D-type channel bank is higher than that of an A-type channel bank. The maximum voice-channel noise allowable in a back-to-back connexion of a D3 channel bank, for example, is 23 dBrncO. If this noise is equally allocated in the transmit and receive sides, the requirement would be 20 dBrncO. If the noise generated in the analogue and digital interface is established a 15 dBrncO, the total noise would be 16.57 dBronc0, that is, the power sum of 15 and 11.4 dBronc0. Therefore, this number was used to determine the word length to be employed in the A/D and D/A converters. 15 dBrncO is of course equivalent to a signal-to-noise ratio of 73 dB, and the number of bits required to obtain this signal-to-noise ratio for a full sine wave in a 4 kHz slot across a 56 band (one-half of the sampling rate $F_{S2} = 112$ kHz) is given by the equation $$n = (73 - 1.8 + 10 \log (4/56))/6 = 59.74/6 \simeq \text{bits}.$$

Since this system is a 12-channel system, the multichannel loading factor should be included in determining the word length of the A/D and D/A converters. The peak sine wave power $Ps_{12}$ for 12 channels is given by $$Ps_{12} = V_o + 0.115\sigma^2 - 1.4 + 10 \log I_L + 10 \log + \Delta_c.$$

dBmO where $V_0 + 0.115\sigma^2 - 1.4 + 10 \log T_L$ is the average power per talker in an N-channel system. For $N = 12$, the multichannel load factor $\Delta_c = 10 \log 12 + 22.5 = 33.3$ dB. For a single channel, however, this Figure is $18.6 - 3 = 15.6$ dB. Therefore, by counting 6 dB/bit of word length, we have $$(33.3 - 15.6)/6 = 17.7/6 \approx 3 \text{ bits}.$$

This means that three additional bits are required to account for the multichannel loading conditions. This leads then to the final word length for the A/D and D/A converters being $10 + 3 = 13$ bits. In the above calculation all channels are considered to have the same volume talker.

Summarizing the advantages of the instant invention, the periodic nature of the sampled analogue signal enables the disclosed circuitry to filter out a selected channel (sideband) without first having to modulate that signal to shift it to some desired frequency range. Further, whenever possible, the channels are grouped during processing to reduce hardware complexity and cost. Also, whereas the traditional Nyquist approach would dictate a sampling rate of at least 216 kHz (i.e. $2 \times 108$ kHz) to adequately represent the highest signal present in desired analogue output, by taking advantage of the special nature of the groupband signal (e.g. which ranges from $60 - 108$ kHz), the instant invention is able to use a sampling rate of only 112 kHz, thus further reducing the complexity and cost of the hardware required. While the preferred embodiment of the invention utilizes Weaver modulators, other forms of digital signal processing may be employed, for example, direct modulation followed by digital bandpass filtering.

To avoid cluttering the drawings, conventional circuit elements, such as power supplies, clock circuits, synchronizing circuits, and the like, have been omitted. Further one skilled in the art will appreciate that various changes or substitutions can be made to the layout of parts shown without departing from the spirit and scope of the invention.

What is claimed is:

1. Apparatus for interconnecting at least one channel in an n-channel, time-division multiplex carrier system with a corresponding channel in a p-channel, frequency-division multiplex, carrier system, $p \geq n$, said at least one channel carrying a first information signal of nominal bandwidth $b$ and said time-division multiplex carrier system having a sampling frequency $k$, the apparatus comprising:

means for increasing the sampling frequency of said at least one time-division multiplex channel from $k$ to $mk$, where $m$ is an integer selected such that the frequency band occupied by said frequency-division multiplex carrier system, when loaded with $p$-channels, lies between the frequencies $mk$ and $2mk$, that is to say, $m$ is selected such that $mk > pb$;

means, connected to said sampling frequency increasing means, for filtering from said channel a plurality of second information signals each having a nominal bandwidth $b$ and each having the same information content as said first information signal, said second information signals being centered about the frequency $mk/4$ and odd harmonics thereof, said filtered second information signals comprising upper and lower, suppressed-carrier, single-sideband signals in the frequency spectrum of said frequency division multiplex carrier system but being displaced from the desired frequency slots therein;

means for modulating said second information signals with the frequency $mk/4$ while simultaneously increasing the sampling frequency thereof from $mk$ to $2mk$ thereby to generate an overlapped upper and lower single-sideband signal of bandwidth $b$ centered about zero frequency and replicas thereof centered about multiples of $mk/2$;

means for filtering from the output of said modulating means all signals other than the overlapped sideband signals centered about zero frequency and the image thereof centered about the frequency $mk$;

means for modulating the output of said modulating output filtering means by the sinusoidal and cosinusoidal functions of the frequency $r$;

means for summing the results of said sinusoidal and cosinusoidal modulation thereby to generate an upper sideband signal of bandwidth $b$ displaced upwardly from zero frequency by the frequency $r$ and a lower sideband signal displaced downwardly from the frequency $2mk$ by the frequency $r$;

a digital-to-analogue converter for converting said upper and lower sideband signals into their analogue equivalents, said conversion being effectuated at the sampling frequency 2 $mk$; and an analogue bandpass filter, having a passband centered about the frequency 3 $mk/2$, connected to the output of said digital-to-analogue converter for rejecting all but said lower sideband signals, the frequency $r$ being selected such that said lower sideband signal occupies the desired frequency slot in the spectrum of the $p$-channel frequency division multiplex carrier system.

2. The apparatus according to claim 1 wherein at least two channels in said $n$-channel time-division multiplex carrier system are simultaneously processed for connection to said frequency-division multiplex system, the apparatus further including:

means, positioned, upstream of said sinusoidal and cosinusoidal modulating means, for modulating with the frequency $mk$ the overlapped upper and lower sideband signals centered about zero frequency of the second one of said at least two channels, said overlapped signals thereby being displaced upwardly by the frequency $mk$ and being centered about the frequency $mk$; and means, positioned upstream of said digital-to-analogue converter, for accumulating the upper and lower sideband signals corresponding to both of said at least two channels, prior to their conversion in the digital-to-analogue converter, the overlapped upper and lower sideband signals of the second one of said at least two channels, when modulated by the sinusoidal and cosinusoidal functions of the frequency $r$, yielding at the output of the digital-to-analogue converter a corresponding analogue lower sideband signal in the spectrum of the frequency division multiplex carrier system which is symmetrically disposed about the frequency $3mk/2$ with respect to the lower sideband analogue signal corresponding to the first one of said at least two channels.

3. The apparatus according to claim 1 wherein said sinusoidal and cosinusoidal modulating means and said summing means together comprise a Weaver modulator having an upper branch and a lower branch, the apparatus further comprising:

means, connected to said upper branch, for generating at least one cosinusoidal signal of frequency $r$; and means, connected to said lower branch, for generating at least one sinusoidal signal of frequency $r$.

4. The apparatus according to claim 1 wherein said $n$-channel time-division multiplex system comprises a 24-channel time-division multiplex system having a sampling frequency $k = 8$ kHz and a per-channel bandwidth $b = 4$ kHz, said p-channel frequency-division multiplex system having a frequency spectrum extending from 60–180 kHz, with $m = 7$; said filtering means comprises a fourteenth order, symmetrical, digital bandpass filter, and said modulating output filtering means comprises at least one third order, low-pass digital filter.

5. The apparatus according to claim 1 wherein 2 $mk$, the sampling frequency of said second information modulating means, is less than the Nyquist sampling frequency for 3 $mk + pb/2$, the highest frequency present in said $p$ channel, frequency-division multiplex carrier system.

6. The apparatus according to claim 1 further comprising means for simultaneously processing at least two of said time-division multiplex channels.

7. Apparatus for interconnecting at least one channel in at least one p-channel, frequency-division multiplex carrier system with a corresponding channel in an $n$-channel time-division multiplex carrier system, $p \geq n$, said time-division multiplex system having a sampling frequency $k$, said at least one channel carrying a first information signal of nominal bandwidth $b$, said information signal appearing as the lower sideband of a suppressed carrier, single-sideband signal, the frequency spectrum of said $p$-channel frequency-division multiplex system being symmetrically disposed between the frequencies $mk$ and 2 $mk$ where $m$ is an integer selected such that $mk \leq pb$, the apparatus comprising:

an analogue-to-digital converter for digitizing said lower sideband signal at a sampling frequency of 2 $mk$, said converter acting to fold the spectrum of the digitized signal about the frequency $mk$ thereby generating an additional, upper-sideband signal lying between zero frequency and the frequency $mk$;

means for modulating said upper and lower sideband signals with the frequency 2 $nb$, where $n = 1$, 2 or 3, said modulation creating juxtaposed upper and lower sideband signals symmetrically located about zero frequency and a mirror image thereof symmetrically disposed about the frequency 2 $mk$;

means for filtering from the output of said modulating means all signals falling between the frequencies $b$ and 2 $mk-b$, said filter passing the juxtaposed upper and lower sideband and mirror image thereof;

means for decreasing the sampling frequency of said sideband and image signals from 2 $mk$ to $mk$ while simultaneously modulating the signals with the sinusoidal and cosinusoidal functions of the frequency $((mk/4) + (b/2))$;

means for summing the sinusoidally and cosinusoidally modulated outputs of said frequency decreasing means thereby to yield a plurality of lower sideband signals representative of said first information signal, which sidebands are symmetrically disposed about the frequency $mk/4$ and odd harmonics thereof;

a semi-symmetrical filter having a plurality of passbands of bandwidth $b$ centered about the frequency $mk/4$, and odd harmonics thereof, for passing said lower sideband signals and rejecting all other signals; and means for decreasing the sampling frequency of the output from said semi-symmetrical filter from $mk$ to $k$ thereby to generate a signal having the spectrum of said channel in the $n$-channel time-division multiplex carrier system.

8. The apparatus according to claim 7 wherein at least two adjacent channels in said p-channel frequency-time division multiplex system are simultaneously processed, the apparatus further comprising:

means for modifying the action of said summing means to subtract, for the second one of said adjacent channels, the sinusoidally modulated output of said frequency decreasing means from the cosinusoidally modulated output of said frequency decreasing means thereby to yield an upper sideband signal properly positioned for filtering in said semi-symmetrical filter; and means, interposed between said frequency decreasing means and said semi-symmetrical filter, for alternating the sign of successive samples in said upper sideband signals thereby to change said signal into a lower sideband signal whereupon the output of said semi-symmetrical filter comprises a signal having the spectrum of a channel in said $n$-channel time-division multiplex system for the second one of said adjacent channels.

9. The apparatus according to claim 8 wherein $p$ adjacent channels in said $p$-channel frequency division multiplex system simultaneously processed, the apparatus further comprising:

means, interposed between said frequency modulating means and said modulating output filter means, for alternating the sign of the samples of the $p/2$ adjacent channels in said $p$-channel frequency division multiplex system which occupy the lower frequency portion of the spectrum thereof, whereby said channels are translated in frequency and are disposed about zero frequency and the frequency $2 mk$ so that they may be further processed in the apparatus as if they were the $p/2$ samples of higher frequency in the spectrum of said frequency division multiplex carrier system.

10. The apparatus according to claim 8 wherein said frequency decreasing means and said summing means together comprise a Weaver modulator having an upper branch and a lower branch, the apparatus further comprising:

means, connected to said lower branch, for generating a sinusoidal signal of frequency $((mk/4) + (b/2))$;

means connected to said upper branch, for generating a cosinusoidal signal of frequency $((mk/4) + (b/2))$.

11. The apparatus according to claim 8 wherein said $n$-channel, time-division multiplex system comprises a 24-channel time-division multiplex system having a sampling frequency $k = 8$ kHz and a nominal per-channel bandwidth $b = 4$ kHz, said $p$-channel frequency division multiplex system comprises a 12-channel frequency-division multiplex system having a frequency spectrum extending from 60–108 kHz, with $m = 7$, said modulating output filter means comprising a recursive, third order, digital, low-pass filter and said semi-symmetrical filter comprising a fourteenth order, semi-symmetrical, digital, bandpass filter.

12. The apparatus according to claim 11 wherein the coefficients of said digital filter are selected to achieve a response tending to equalize for the effects of the channelizing filters employed in the frequency-division multiplex channel banks employed at the distant end of said $p$-channel frequency-division multiplex carrier system.

* * * * *